(12) United States Patent
Song et al.

(10) Patent No.: US 9,756,379 B2
(45) Date of Patent: Sep. 5, 2017

(54) DISPLAY APPARATUS AND CONTROL METHOD THEREOF

(71) Applicant: SAMSUNG ELECTRONICS CO., LTD., Suwon-si, Gyeonggi-do (KR)

(72) Inventors: Ji-hyun Song, Suwon-si (KR); Mun-Seok Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/872,465

(22) Filed: Oct. 1, 2015

(65) Prior Publication Data

US 2016/0100213 A1    Apr. 7, 2016

(30) Foreign Application Priority Data

Oct. 2, 2014 (KR) ........................ 10-2014-0133212

(51) Int. Cl.
  *G06F 3/00* (2006.01)
  *G06F 13/00* (2006.01)
  (Continued)

(52) U.S. Cl.
  CPC ..... *H04N 21/4345* (2013.01); *H04N 5/44591* (2013.01); *H04N 5/50* (2013.01);
  (Continued)

(58) Field of Classification Search
  CPC ........... H04N 21/4345; H04N 21/4823; H04N 21/84; H04N 21/4432; H04N 5/44543;
  (Continued)

(56) References Cited

U.S. PATENT DOCUMENTS

| 7,661,119 B1 * | 2/2010 | Arsenault ................ H04N 7/20 348/461 |
| 8,949,903 B2 * | 2/2015 | Gudlavenkatasiva ........................... H04N 21/466 725/52 |

(Continued)

FOREIGN PATENT DOCUMENTS

| EP | 2 164 253 | 3/2010 |
| EP | 2 219 370 | 8/2010 |

(Continued)

OTHER PUBLICATIONS

International Search Report dated Jan. 28, 2016 from International Application No. PCT/KR2015/010419, 3 pages.
Extended European Search Report dated May 17, 2017 from European Patent Application No. 15847609, 7 pages.

*Primary Examiner* — Oschta Montoya
(74) *Attorney, Agent, or Firm* — Staas & Halsey LLP

(57) ABSTRACT

A display apparatus includes a signal receiver configured to receive a broadcast signal comprising a broadcast content and channel information and corresponding to a plurality of channels, a signal processor configured to process the received broadcast signal and extract the broadcast content and the channel information from the broadcast signal, a display configured to display an image based on the extracted broadcast content, and a controller configured to determine a plurality of overlapped channels, which have the same broadcast content but are different in a type of broadcast content, based on the extracted channel information, and perform a control operation for the determined overlapped channels. A method of controlling the display apparatus includes determining a plurality of overlapped channels, which have the same broadcast content but are different in a type of broadcast content, based on the extracted channel information, and performing a control operation for the determined overlapped channels.

25 Claims, 42 Drawing Sheets

(51) Int. Cl.
*H04N 5/445* (2011.01)
*H04N 21/434* (2011.01)
*H04N 21/482* (2011.01)
*H04N 21/84* (2011.01)
*H04N 5/50* (2006.01)
*H04N 21/443* (2011.01)
*H04N 21/462* (2011.01)
*H04N 21/485* (2011.01)
*H04N 21/488* (2011.01)

(52) U.S. Cl.
CPC ..... *H04N 21/4432* (2013.01); *H04N 21/4622* (2013.01); *H04N 21/4823* (2013.01); *H04N 21/4854* (2013.01); *H04N 21/4882* (2013.01); *H04N 21/84* (2013.01); *H04N 5/44543* (2013.01); *H04N 2005/4456* (2013.01); *H04N 2005/44565* (2013.01)

(58) Field of Classification Search
CPC ................ H04N 5/44591; H04N 5/50; H04N 2005/4456; H04N 2005/44565
See application file for complete search history.

(56) References Cited

U.S. PATENT DOCUMENTS

| | | | |
|---|---|---|---|
| 2002/0101541 A1* | 8/2002 | Takagi | H04H 40/18 348/569 |
| 2004/0244052 A1* | 12/2004 | Kim | H04N 5/44543 725/126 |
| 2009/0205009 A1 | 8/2009 | Kim | |
| 2010/0162304 A1* | 6/2010 | Ko | H04N 5/44513 725/37 |
| 2010/0263003 A1 | 10/2010 | Gupta et al. | |
| 2010/0269139 A1 | 10/2010 | Kim | |
| 2011/0234906 A1 | 9/2011 | Jackson | |
| 2012/0210367 A1 | 8/2012 | Lee et al. | |
| 2012/0266194 A1* | 10/2012 | Klosterman | H04N 5/44543 725/48 |
| 2014/0157324 A1* | 6/2014 | Mao | H04N 21/2323 725/54 |

FOREIGN PATENT DOCUMENTS

| | | |
|---|---|---|
| KR | 10-2010-0031845 | 3/2010 |
| KR | 10-2010-0107141 | 10/2010 |
| KR | 10-2010-0130048 | 12/2010 |

* cited by examiner

FIG. 8

| Syntax | No. of Bits | Format |
|---|---|---|
| terrestrial_virtual_channel_table_section() { | | |
|    table_id | 8 | 0xC8 |
|    section_syntax_indicator | 1 | uimsbf |
|    protocol_version | 8 | '111111' |
|    num_channels_in_section | 8 | uimsbf |
|    for(i=0;i<num_channels_in_section;i++) { | | |
|       short_name | 7*16 | uimsbf |
|       reserved | 4 | '1111' |
|       major_channel_number | 10 | uimsbf |
|       minor_channel_number | 10 | uimsbf |
|       modulation_mode | 8 | uimsbf |
|       carrier_frequency | 32 | uimsbf |
|       channel_TSID | 16 | uimsbf |
|       program_number | 16 | uimsbf |
|       ETM_location | 2 | uimsbf |
|       access_controlled | 1 | bslbf |
|       hidden | 1 | bslbf |
|       reserved | 2 | '11' |
|       hide_guide | 1 | bslbf |
|       reserved | 3 | '111' |
|       service_type | 6 | uimsbf |
|       source_id | 16 | uimsbf |
|       reserved | 6 | '111111' |
|       descriptors_length | 10 | uimsbf |
|       for(i=0;i<N;i++) { | | |
|          descriptor() | | |
|    } | | |
| } | | |

81 — (table_id / section_syntax_indicator region)
82 — CHANNEL LOOP INFORMATION

DISPLAY APPARATUS AND CONTROL METHOD THEREOF

CROSS-REFERENCE TO RELATED APPLICATIONS

This application claims the priority benefit of Korean Patent Application No. 10-2014-0133212, filed on Oct. 2, 2014 in the Korean Intellectual Property Office, the disclosure of which is incorporated herein by reference in its entirety.

BACKGROUND

1. Field

Apparatuses and methods disclosed herein relate to a display apparatus and a control method thereof, and more particularly to a display apparatus which may receive a broadcast signal and display an image of a broadcast content, and a control method thereof.

2. Description of the Related Art

A display apparatus such as a television (TV) receives a broadcast signal carrying a broadcast content such as a drama, news, video on demand (VOD), etc., and extracts the broadcast content from the received broadcast signal, thereby displaying an image based on the extracted broadcast content.

The display apparatus receives a broadcast signal corresponding to one channel selected by a user among broadcast signals transmitted from a broadcasting station and corresponding to a plurality of channels. For example, two or more channels of the broadcast signals received in the display apparatus may be overlapped. Specifically, a first broadcast content extracted from a broadcast signal of a first channel and a second broadcast content extracted from a broadcast signal of a second channel may be the same with respect to contents such as a movie, a drama, news, etc., but may be different in a type such as a resolution, a video format, etc. (hereinafter, two or more channels in this case will be called or referred to as a 'overlapped channel').

As TVs supporting a resolution of ultrahigh definition (UHD) has recently been on the rise, it is considered that the overlapped channels of various resolutions (e.g., high definition (HD), ultrahigh definition (UHD), etc.) are simultaneously broadcasted by taking compatibility with the existing TVs into account. If the broadcast signal does not carry any separate information about the overlapped channels, the display apparatus cannot inform a user of such overlapped channels. That is, a user is informed of whether a certain channel is the overlapped channel only after s/he selects the corresponding channel. If the display apparatus finds out the overlapped channels during automatic channel setting, a channel list including the found overlapped channels may be stored as a selectable channel. Therefore, it is inconvenient for a user since s/he repetitively experiences two or more overlapped channels with regard to the same contents while selecting a channel based on the channel list.

To solve such a problem of the overlapped channels, the display apparatus may use typical information obtained from a broadcast signal in order to determine whether a certain channel is an overlapped channel. However, this method is not reliable since the obtained information may be varied depending on conditions that the display apparatus currently receives a broadcast signal. Likewise, a broadcast signal receiving apparatus such as a set-top box, which receives a broadcast signal and provides it to a TV, may also have the same problem as mentioned above.

SUMMARY

One or more exemplary embodiments may provide a display apparatus, which provides information about overlapped channels or operates based on the information about the overlapped channels to thereby improve user convenience, and a control method thereof.

Another exemplary embodiment may provide a display apparatus, which is more reliable and convenient to determine whether a certain channel is an overlapped channel, and a control method thereof.

Additional aspects and/or advantages will be set forth in part in the description which follows and, in part, will be apparent from the description, or may be learned by practice of the disclosure.

In accordance with an exemplary embodiment, there is provided a display apparatus including a signal receiver configured to receive a broadcast signal comprising a broadcast content and channel information and corresponding to a plurality of channels, a signal processor configured to process the received broadcast signal and extract the broadcast content and the channel information from the broadcast signal, a display configured to display an image based on the extracted broadcast content, and a controller configured to determine a plurality of overlapped channels, which have the same broadcast content but are different in a type of broadcast content, based on the extracted channel information, and perform a control operation for the determined overlapped channels. Accordingly, user convenience is improved since information about overlapped channels is provided or operations are performed based on the information about the overlapped channels.

The channel information of the overlapped channel may include first channel information of a first channel for providing a first broadcast content, and second channel information of a second channel for providing a second broadcast content which has the same content as the first channel but different in a type from the first broadcast content. Thus, it is more reliable and easier to determine whether channels are the overlapped channels and operate based on the determination.

The channel information may include information about at least one of broadcast content identification (ID), broadcasting station ID, channel ID, a carrier frequency and a modulation mode, and the first channel information and the second channel information may be different in information about at least one of the above.

The first channel information and the second channel information may be contained in the same channel loop of a virtual channel table (VCT) of a corresponding channel. Thus, it is simple and reliable to give information to be used for determining whether channels are the overlapped channels, without changing the existing standards for a broadcast signal.

The broadcast signal of the first channel may include the first channel information and the second channel information, and the broadcast signal of the second channel may include the second channel information.

The type of the broadcast content may include at least one of a resolution and a video format of the broadcast content.

The controller may store a channel list that selectively includes all or some channels among the plurality of overlapped channels. Accordingly, user convenience is improved since s/he may select whether to store the overlapped channels in accordance with his/her tastes.

The controller may display a user interface (UI) for selecting whether to add the overlapped channel to the channel list, and the channel list may be stored in accordance with a user's input using the UI. Thus, user convenience is more improved since s/he may select whether to store the overlapped channels through a given UI.

The controller may display the UI during automatic channel setting. Thus, user convenience may be more improved since s/he may have no need of entering a separate menu for setting the overlapped channels.

The UI may comprise an item to delete the overlapped channel from the channel list or add the overlapped channel not included in the channel list. Thus, user convenience is more improved since s/he may more easily edit the overlapped channels.

The controller displays a UI for informing that there is an overlapped channel if a channel corresponding to the overlapped channel is scanned while receiving the broadcast signal. Thus, user convenience is more improved since s/he may be easily informed of the presence of the overlapped channel without entering any separate menu.

The controller may display a UI for selecting whether to add the scanned overlapped channel to the channel list. Thus, user convenience is more improved since s/he may easily add a channel released from the overlapped channel to the channel list without entering any separate menu.

If the channel released from the overlapped channel is not included in the channel list, the controller may add the corresponding channel to the channel list. Thus, user convenience is more improved since s/he may easily add a new overlapped channel to a channel list without entering any separate menu.

If the channel released from the overlapped channel is not included in the channel list, the controller may add the corresponding channel to the channel list. Thus, user convenience is more improved since s/he may be informed of the release of the overlapped channel without entering any separate menu.

In accordance with another exemplary embodiment, there is provided a method of controlling a display apparatus, the method including receiving a broadcast signal which may include a broadcast content and channel information and corresponds to the plurality of channels, extracting extract the broadcast content and the channel information from the broadcast signal by processing the received broadcast signal, displaying an image based on the extracted broadcast content, and determining a plurality of overlapped channels, which have the same broadcast content but are different in a type of broadcast content, based on the extracted channel information, and performing a control operation for the determined overlapped channels. Accordingly, user convenience is improved since information about overlapped channels is provided or operations are performed based on the information about the overlapped channels.

The channel information of the overlapped channel may comprise first channel information of a first channel for providing a first broadcast content, and second channel information of a second channel for providing a second broadcast content which has the same content as the first channel but different in a type from the first broadcast content. Thus, it is more reliable and easier to determine whether channels are the overlapped channels and operate based on the determination.

The channel information may include information about at least one of broadcast content identification (ID), broadcasting station ID, channel ID, a carrier frequency and a modulation mode, and the first channel information and the second channel information may be different in information about at least one of the above.

The first channel information and the second channel information may be contained in the same channel loop of a virtual channel table (VCT) of a corresponding channel. Thus, it is simple and reliable to give information to be used for determining whether channels are the overlapped channels, without changing the existing standards for a broadcast signal.

The broadcast signal of the first channel may include the first channel information and the second channel information, and the broadcast signal of the second channel may include the second channel information.

The type of the broadcast content may include at least one of a resolution and a video format of the broadcast content.

The performing the control operation may include storing a channel list that selectively includes all or some channels among the plurality of overlapped channels. Accordingly, user convenience is improved since s/he may select whether to store the overlapped channels in accordance with his/her tastes.

The performing the control operation may include displaying a user interface (UI) for selecting whether to add the overlapped channel to the channel list, and the storing the channel list may include storing the channel list in accordance with a user's input using the UI. Thus, user convenience is more improved since s/he may select whether to store the overlapped channels through a given UI.

The displaying the UI may include displaying the UI during automatic channel setting. Thus, user convenience is more improved since s/he may have no need of entering a separate menu for setting the overlapped channels.

The UI may include an item to delete the overlapped channel from the channel list or add the overlapped channel not included in the channel list. Thus, user convenience is more improved since s/he may more easily edit the overlapped channels.

The performing the control operation may include displaying a UI for informing that there is an overlapped channel if a channel corresponding to the overlapped channel is scanned while receiving the broadcast signal. Thus, user convenience is more improved since s/he may be easily informed of the presence of the overlapped channel without entering any separate menu.

The performing the control operation may include displaying a UI for selecting whether to add the scanned overlapped channel to the channel list. Thus, user convenience is more improved since s/he may easily add a new overlapped channel to a channel list without entering any separate menu.

If a channel determined as the overlapped channel is no longer the overlapped channel, the performing the control operation may include displaying a UI for informing a user that the corresponding channel is released from the overlapped channel. Thus, user convenience is more improved since s/he may be informed of the release of the overlapped channel without entering any separate menu.

If the channel released from the overlapped channel is not included in the channel list, the performing the control operation may include adding the corresponding channel to the channel list. Thus, user convenience is more improved since s/he may easily add a channel released from the overlapped channel to the channel list without entering any separate menu.

BRIEF DESCRIPTION OF THE DRAWINGS

The above and/or other aspects will become apparent and more readily appreciated from the following description of exemplary embodiments, taken in conjunction with the accompanying drawings, in which:

FIG. 8 shows an example of a virtual channel table (VCT) according to an exemplary embodiment;

DETAILED DESCRIPTION

Figure 1:
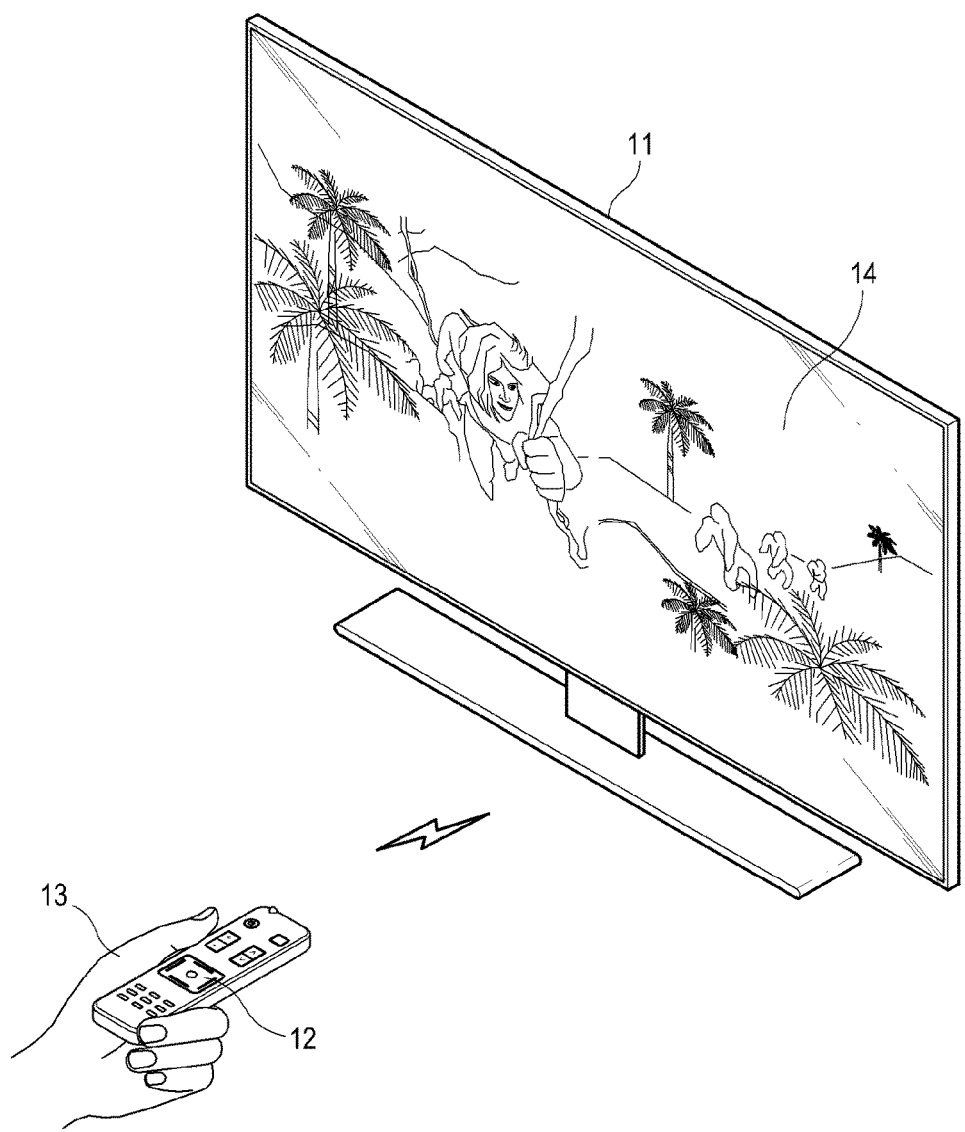
FIG. 1 shows a display apparatus according to an exemplary embodiment.

Reference will now be made in detail to example embodiments which are illustrated in the accompanying drawings, wherein like reference numerals refer to like elements throughout. The embodiments are described below to explain the disclosure by referring to the figures.

Below, exemplary embodiments will be described in detail. FIG. 1 shows a display apparatus 11 according to an exemplary embodiment. The display apparatus 11 according to an exemplary embodiment may be embodied as a TV for example. The display apparatus 11 may receive a command of a user 13 from a remote controller 12, and may receive a broadcast signal in response to the command of the user 13, and may display an image 14 based on the broadcast content carried on the broadcast signal.

Figure 2:
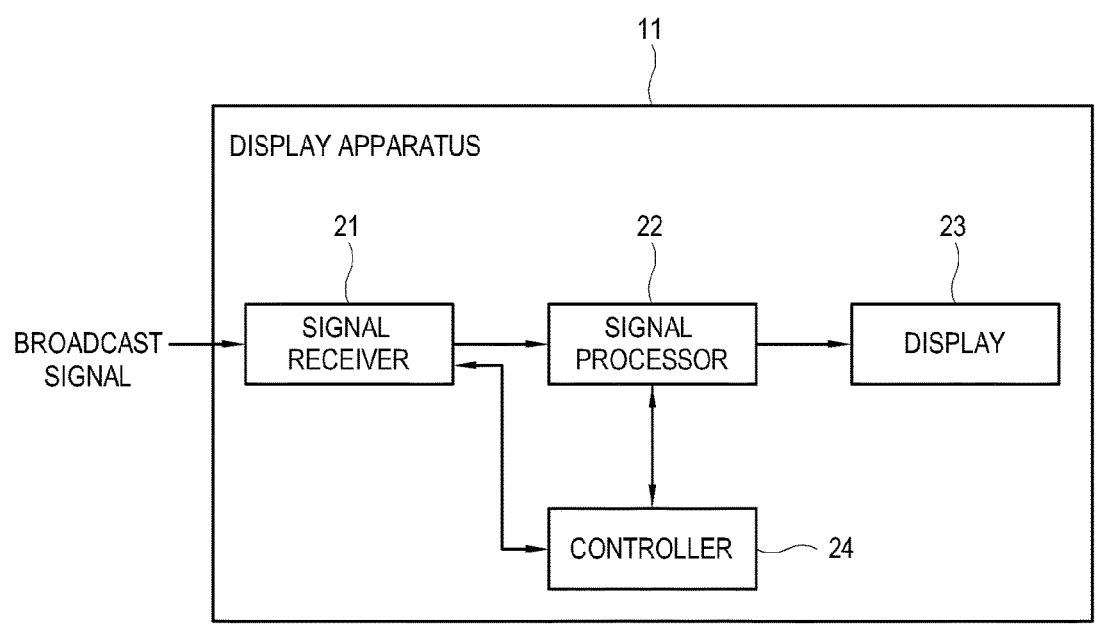
FIG. 2 is a block diagram of the display apparatus according to an exemplary embodiment.

FIG. 2 is a block diagram of the display apparatus 11 according to an exemplary embodiment. As shown in FIG. 2, the display apparatus 11 may include a signal receiver 21, a signal processor 22, a display 23 and a controller 24.

The signal receiver 21 may receive a broadcast signal. The signal receiver 21 may receive a broadcast signal from a broadcast signal transmitter of a broadcasting station, or may receive a broadcast signal from a relay relaying the broadcast signal from the broadcast signal transmitter. The broadcast signal received in the signal receiver 21 may include a wired signal and/or a wireless signal. The broadcast signal received in the signal receiver 21 may be a digital signal and/or an analog signal. The broadcast signal received in the signal receiver 21 may be a sky wave signal, a cable signal, a satellite signal or a network signal. In this exemplary embodiment, the broadcast signal may be a digital TV signal that for example complies with advanced television systems committee (ATSC) standards. However, there is no limit to the standards of the broadcast signal according to an exemplary embodiment.

The signal receiver 21 may receive a broadcast signal of one channel among the plurality of channels under control of the controller 24. The broadcast signal carries a broadcast content provided by the broadcasting station. The broadcast content may include various broadcasting programs such as a drama, a movie, news, sports, music, video on demand, etc. without limitation. The broadcast content may include an image, and may further include at least one of voice and additional information.

Further, the broadcast signal according to an exemplary embodiment carries channel information for determining whether the received channel is an overlapped channel. In this exemplary embodiment, the overlapped channels refer to the plurality of channels that have the same broadcast content but are different in a type of broadcast content. The sameness of the broadcast content means that the plurality of channels provide one broadcast content such as the same program (e.g., the same drama, the same news, etc.). The difference in the type of broadcast content means that the plurality of channels providing one broadcast content are different in a resolution, a video format, etc. from one another. For example, with regard to the broadcast content of the same news, a first channel may provide the news in a high definition (HD) resolution, but a second channel may provide the news in an ultrahigh definition (UHD) resolution which has a higher resolution than the HD resolution. According to an exemplary embodiment, the type of broadcast content may include not only the resolution, but also the video format such as codec, an aspect ratio and the like by which an image may be variously displayed. Alternatively, the difference in the type of broadcast content according to an exemplary embodiment may include a difference in the quality of the broadcast content with regard to the same broadcast content.

The signal processor 22 may process a broadcast signal received in the signal receiver 21. The signal processor 22 may process the broadcast signal under control of the controller 24, and may extract a broadcast content and channel information carried on the broadcast signal. The signal processor 22 may extract the broadcast content and the channel information by performing signal processing corresponding to the format of the received the broadcast signal.

The display 23 may display an image based on contents extracted by the signal processor 22. The display 23 may include one of display devices such as a liquid crystal display (LCD), a plasma display panel (PDP), an organic light emitting diode (OLED), etc.

The controller 24 may determine a plurality of overlapped channels, which have the same broadcast content but are different in the type of broadcast content, among the plurality of channels based on the extracted channel information, and may perform control for the determined overlapped channels. For example, the controller 24 may perform control so that a user cannot select at least one channel (e.g., by omitting the at least one channel from a channel list), which is selected as the overlapped channel, among the plurality of channels. In addition, the controller 24 may perform control so that a user may be informed of the overlapped channels. The controller 15 may include a non-volatile memory in which a control program is stored, a volatile memory in which at least a part of the control program is loaded, and a microprocessor for executing the control program.

Figure 3:
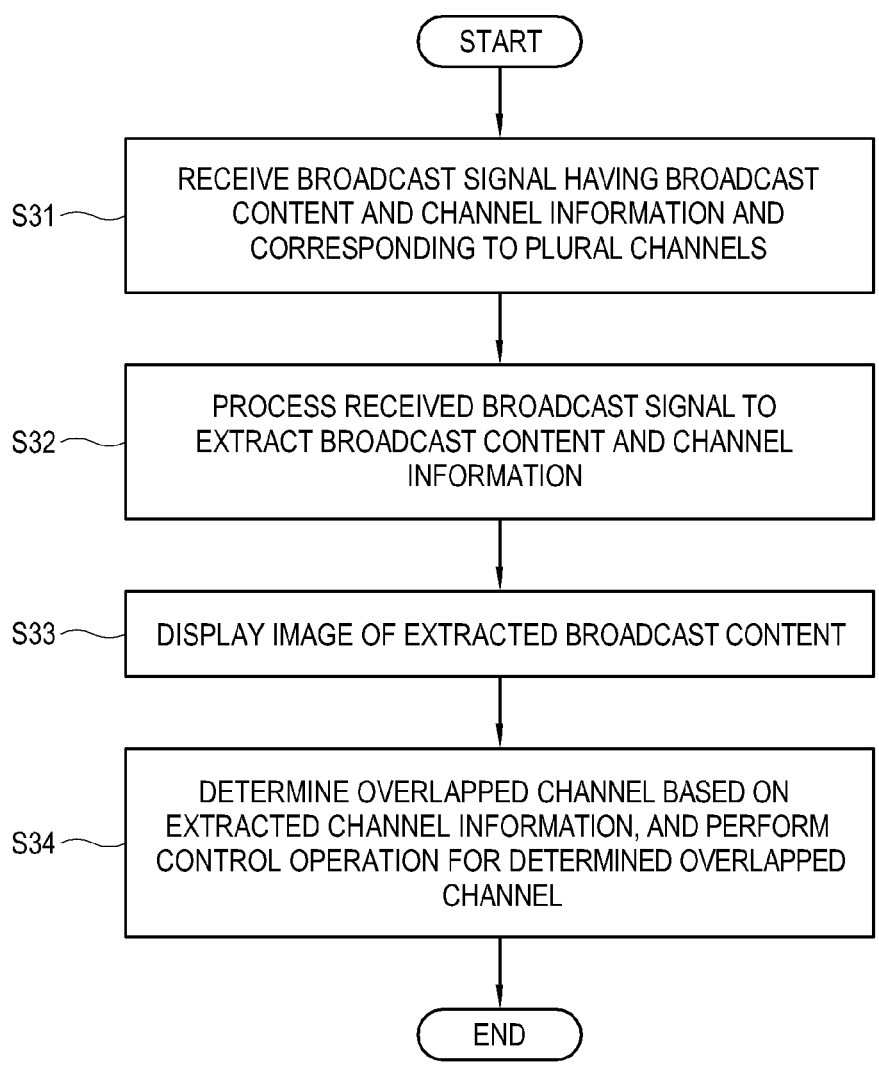
FIG. 3 is a flowchart showing a control method of the display apparatus according to an exemplary embodiment.

FIG. 3 is a flowchart showing a control method of the display apparatus 11 according to an exemplary embodiment. The control method of the display apparatus 11 set forth herein may be performed under control of the controller 24. At operation S31, the display apparatus 11 receives a broadcast signal corresponding to a plurality of channels, which carries the broadcast content and the channel information. At operation S32, the display apparatus 11 processes the received broadcast signal to extract the broadcast content and the channel information. At operation S33, the display apparatus 11 displays an image based on the extracted broadcast content. At operation S34, the display apparatus 11 determines a plurality of overlapped channels, which have the same broadcast content but are different in the type of broadcast content, among the plurality of channels based on the extracted channel information, and performs control for the determined overlapped channels.

As an alternative to the control method of the display apparatus 11 shown in FIG. 3, the display of the image based on the broadcast content (i.e. the operation S33) and the determination of the overlapped channel based on the channel information and the control for the determined overlapped channel (i.e. the operation S34) may be reversed in order. Alternatively, the display of the image based on the broadcast content (i.e. the operation S33) and the determination of the overlapped channel based on the channel information and the control for the determined overlapped channel (i.e. the operation S34) may be performed at the same time.

Like this, the display apparatus 11 according to an exemplary embodiment determines the overlapped channels based on the channel information carried on the received broadcast signal and performs the control for the determined overlapped channels so that a user cannot be confused by the plurality of overlapped channels, thereby improving user convenience. Further, the display apparatus 11 according to an exemplary embodiment uses the channel information carried on the received broadcast signal to determine the overlapped channels, thereby having higher reliability of determining the overlapped channels.

Figure 4:
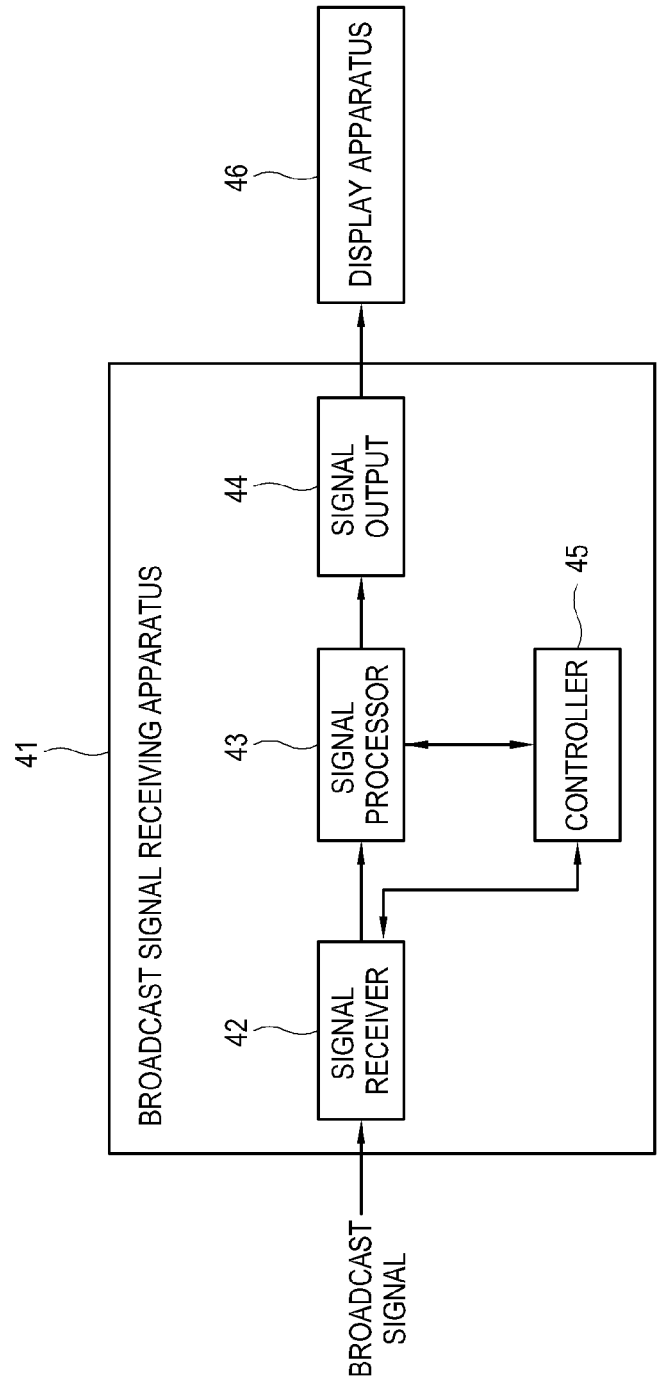
FIG. 4 is a block diagram of a broadcast signal receiving apparatus according to an exemplary embodiment.

FIG. 4 is a block diagram of a broadcast signal receiving apparatus 41 according to an exemplary embodiment.

In this exemplary embodiment, the broadcast signal receiving apparatus 41 may for example be embodied as a set-top box for a TV for example, and include a signal receiver 42, a signal processor 43, a signal output 44 and a controller 45. The signal receiver 42, the signal processor 43 and the controller 45 shown in FIG. 4 may have the same or similar configuration as the signal receiver 21, the signal processor 22 and the controller 24 shown in FIG. 2, respectively. The signal output 44 may output a video signal and/or an audio signal of a broadcast content processed by the signal processor 22 to the display apparatus 46. The display apparatus 46 may output an image and sound based on the image signal and/or sound signal of the broadcast content output from the signal output 44 of the broadcast signal receiving apparatus 41.

Figure 5:
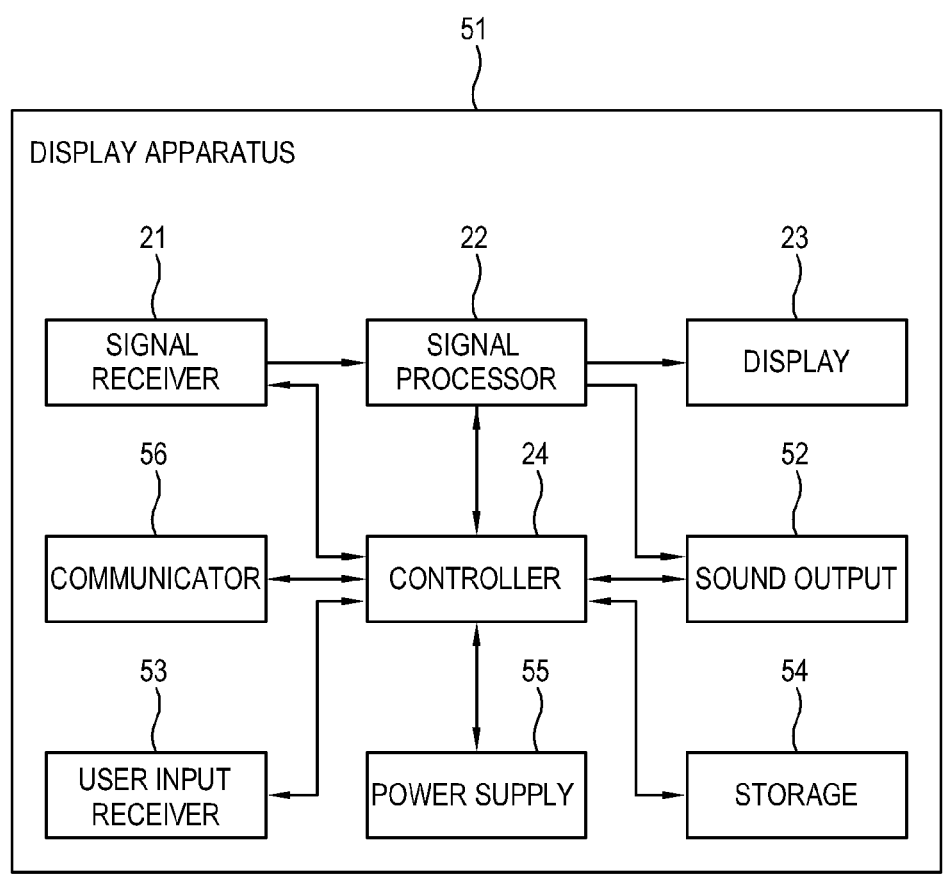
FIG. 5 is a block diagram of a display apparatus according to an exemplary embodiment.

FIG. 5 is a block diagram of a display apparatus 51 according to an exemplary embodiment. The display apparatus 51 shown in FIG. 5 may further include a communicator 56, a sound output 52, a user input receiver 53, a power supply 52 and a storage 54 in addition to the elements of the display apparatus 11 shown in FIG. 2.

The communicator 51 may communicate with a server, a personal computer (PC) or a like different terminal through a network such as the Internet, or may communicate with a smart phone, a smart pad and a like portable terminal or a note personal computer (PC) through a wireless method such as via Wi-Fi, Bluetooth, etc. The communicator 56 may receive a video signal and/or an audio signal from the server, the portable terminal, the note PC, etc. The video signal and/or audio signal received in the communicator 56 may be processed by the signal processor 22.

The sound output 52 may include a loudspeaker that outputs a sound based on the audio signal processed by the signal processor 22. The user input receiver 53 may include a remote signal receiver to receive a remote signal corresponding to a user's input from a remote controller 12. The user input receiver 53 may include a button input having at least one button for receiving a user's input. Thus, a user may select a desired channel among the plurality of channels of the broadcast signals through the remote controller 12. The user input receiver 53 may further include a sound input for receiving a sound (voice) corresponding to a user's input, a camera for taking a picture corresponding to a user's input, and/or a motion sensor for sensing a motion corresponding to a user's input.

The storage 54 may store information about one or more computer programs needed for operating the display apparatus 51. The one or more computer programs needed for operating the display apparatus 51 may include control programs corresponding to operations of the controller 24. The control program of the controller 24 may include at least one among a basic input/output system (BIOS), a device driver, an operating system and an application program. The storage 54 may store channel information extracted from a broadcast signal. The storage 54 may include one or at least two nonvolatile memories.

The power supply 55 may receive electric power from an external source and may supply power having levels adapted for the respective elements of the display apparatus 51. Meanwhile, the signal receiver 21 may include a tuner for receiving a broadcast signal. The signal receiver 21 may further include an interface that connects with an imaging device such as a digital versatile disc (DVD) player, a PC, a set-top box, etc. or a storage device such as a universal serial bus (USB) storage medium, etc., and receives a video signal and/or an audio signal from the imaging device, the storage device, etc. In addition, the controller 24 may include one or two or more processors. For example, the controller 24 may include a main central processing unit (CPU) for performing main control including control operations, and an auxiliary processor for performing sub control including power control, input/output control, etc. The display apparatus according to an exemplary embodiment may exclude at least one element from the elements of the display apparatus 51, or may include another element without being limited to the elements of the display apparatus 51 shown in FIG. 5.

The signal receiver 21 may receive a radio frequency (RF) signal as a broadcast signal. The signal receiver 21 may be tuned to one channel among the plurality of channels and receive the RF signal through the tuned channel. The signal receiver 21 may include a local oscillator, and mixes an output signal of the local oscillator with the received RF signal into a signal having an intermediate frequency. The signal receiver 21 may apply amplification and filtering to the converted signal having the intermediate frequency. The signal receiver 21 may convert the analog signal having the intermediate frequency into a baseband signal. The signal receiver 21 may further convert the analog baseband signal into a digital signal.

Figure 6:
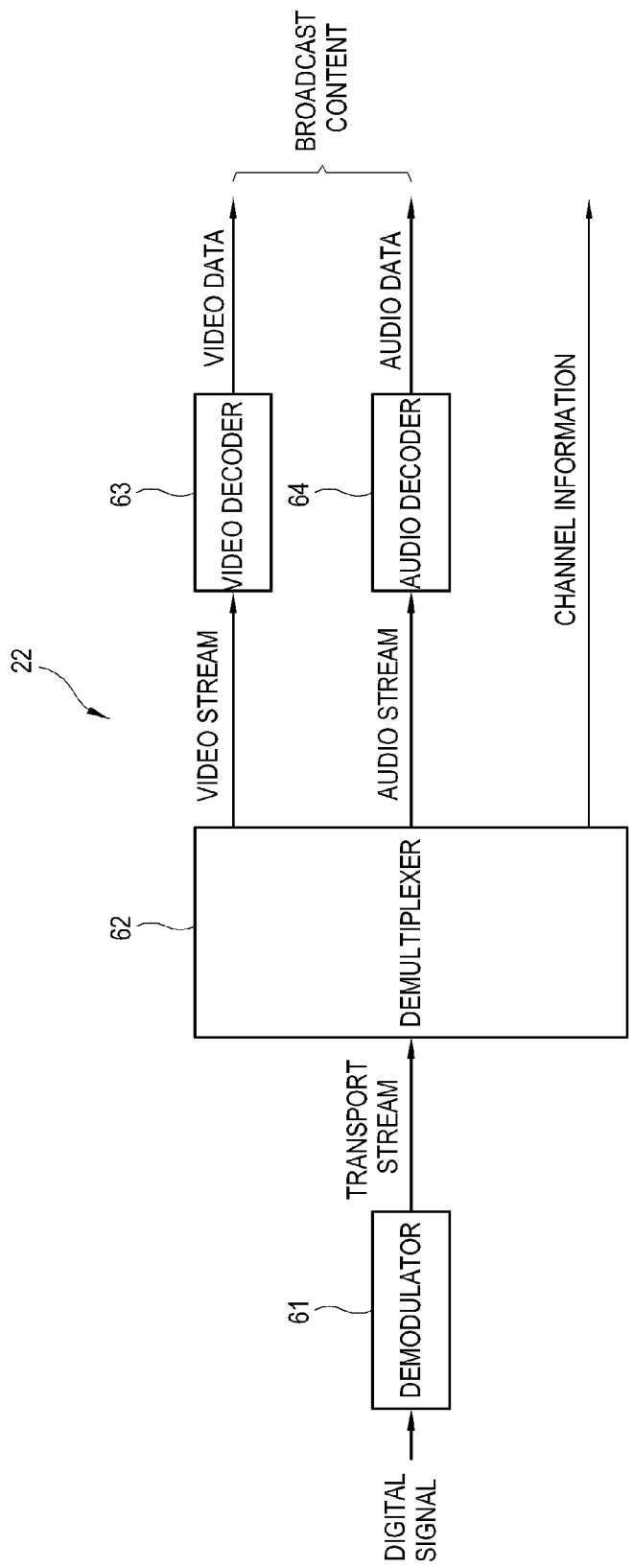
FIG. 6 is a block diagram of a signal processor according to an exemplary embodiment.

FIG. 6 is a block diagram of a signal processor 22 according to an exemplary embodiment. The signal processor 22 may include a demodulator 61, a demultiplexer 62, a video decoder 63 and an audio decoder 64. The demodulator 61 may receive a digital signal output from the signal receiver 21 and may modulate the digital signal. The demodulation performed by the demodulator 61 corresponds to the modulation of the received broadcast signal, and may include 8-vestigial sideband (VSB), orthogonal frequency-division multiplexing (OFDM), etc. The demodulator 61 may output a transport stream as a kind of demodulated signal. The transport stream output from the demodulator 61 may include a moving picture experts group (MPEG)-2 transport stream.

The demultiplexer 62 may demultiplex the transport stream output from the demodulator 61. The demultiplexer 62 may output a video stream, an audio stream and channel information by demultiplexing the transport stream. The video stream may include an MPEG-2 bit stream. The audio stream may include audio codec 3, advanced codec 3, and/or acoustic coder 3 (AC3), etc.

The video decoder 63 may receive the video stream output from the demultiplexer 62 and may decode the video stream. The video decoder 63 may decode the MPEG-2 bit stream. The video decoder 63 may output video data as a result of decoding. The video data output from the video decoder 63 may include video data of the broadcast content according to an exemplary embodiment. The display 23 may display an image of the broadcast content based on the video data output from the video decoder 63.

The audio decoder 64 may receive an audio stream output from the demultiplexer 62 and may decode the audio stream. The audio decoder 64 may decode an AC3 bit stream. The audio decoder 64 may output audio data as a result of decoding. The audio data output from the video decoder 63 may include audio data of the broadcast content according to an exemplary embodiment. The sound output 52 may output a sound of the broadcast content based on the audio data output from the audio decoder 64.

The channel information output from the demultiplexer 62 is an example of channel information extracted from the broadcast signal according to an exemplary embodiment. The demultiplexer 62 may output channel information based on program and system information protocol (PSIP) of advanced television system committee (ATSC). The channel information output from the demultiplexer 62 contains a virtual channel table (VCT) that provides a list of attributes of respective channels carried on the received broadcast signal. The channel information may further contain an event information table (EIT) that provides information such as a title, a start time, etc. of the broadcast content, i.e., a program of a channel defined in the list of the VCT. The VCT provides information for interconnecting the corresponding channel with the EIT.

Figure 7:
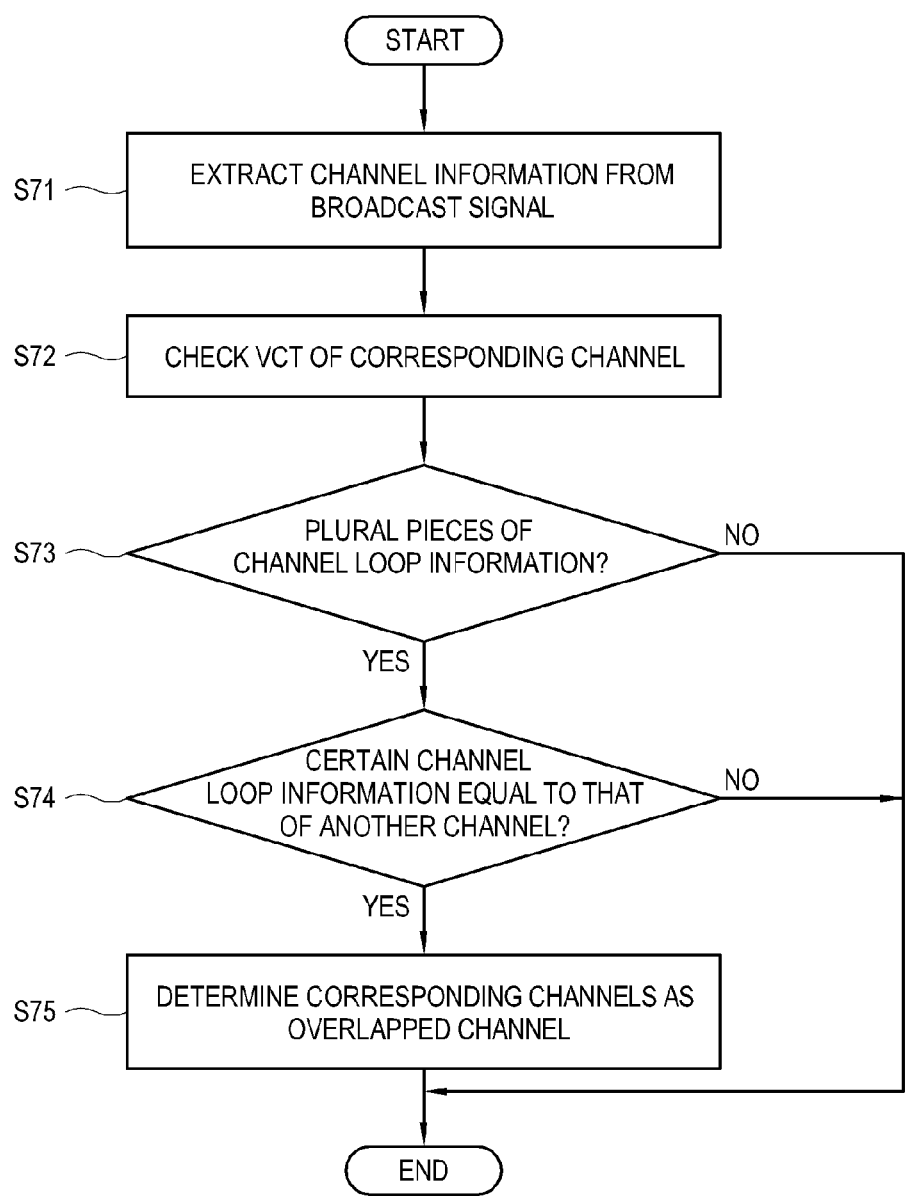
FIG. 7 is a flowchart showing a control method of a display apparatus according to an exemplary embodiment.

FIG. 7 is a flowchart showing a control method of a display apparatus according to an exemplary embodiment. For reference, the control method of the display apparatus set forth herein may be applied to not only the display apparatus 11 shown in FIG. 2 but also the display apparatus

51 shown in FIG. 5. For convenience of description, the display apparatus 11 will be described as a representative display apparatus, however any of the embodiments disclosed herein may be applied to the display apparatus 51 as well. At operation S71 of FIG. 7, the display apparatus 11 may extract the channel information from the received broadcast signal. Next, at operation S72, the display apparatus 11 may check the VCT of the corresponding channel based on the extracted channel information. The remaining operations shown in FIG. 7 will be described later.

FIG. 8 shows an example of a virtual channel table (VCT) according to an exemplary embodiment. The VCT 81 shown in FIG. 8 is an example of a terrestrial virtual channel table (TVCT) carried on a terrestrial broadcast signal. According to an exemplary embodiment, the VCT is not limited to the VCT 81 shown in FIG. 8, and may for example include a cable virtual channel table (CVCT) carried on a cable broadcast signal. As shown in FIG. 8, the VCT 81 may contain channel loop information 82 showing details of the corresponding channel. Specifically, the channel loop information 82 may include 'short_name' showing the name of the corresponding channel, 'major_channel_number' showing a major channel number of the corresponding channel, 'minor_channel_number' showing a minor channel number of the corresponding channel, 'modulation_mode' showing a modulation mode of a broadcast signal for the corresponding channel, 'carrier_frequency' setting 32 bit into 0 or showing a frequency of the corresponding channel, 'channel_TSID' showing MPEG-2 transport stream ID carrying an MPEG-2 program to be referred to by the corresponding channel, 'program_number' showing the number of the corresponding channel defined in a program map table (PMT), etc.

Figure 9:
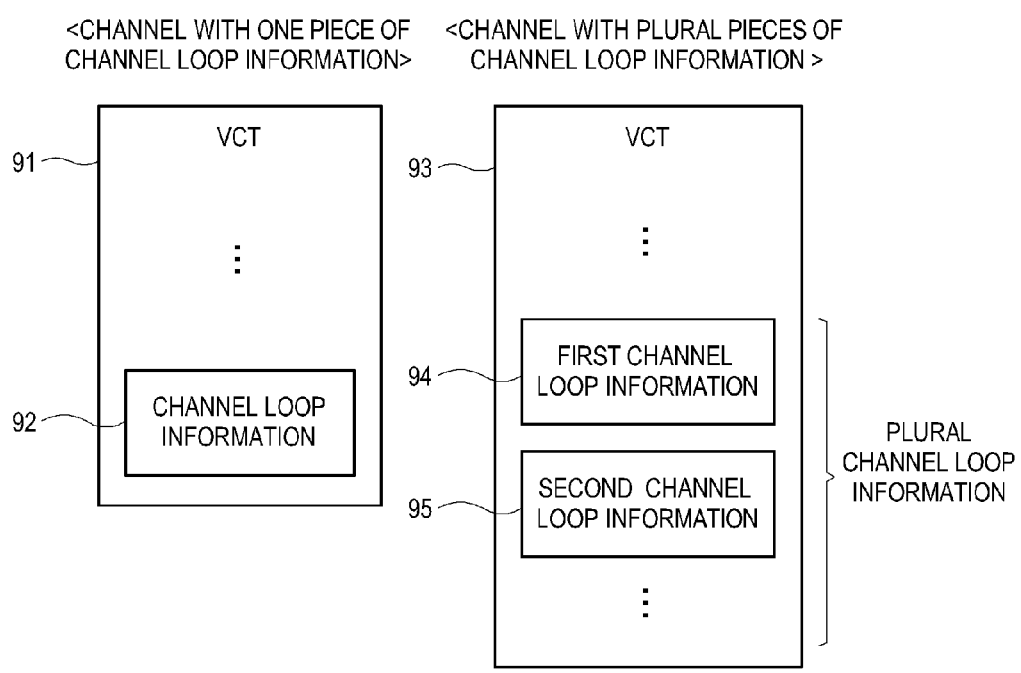
FIG. 9 shows an example of the VCT containing channel loop information according to an exemplary embodiment.

In this exemplary embodiment, one or a plurality of pieces of the channel loop information 82 may be provided per channel. FIG. 9 shows an example of the VCT containing the channel loop information according to an exemplary embodiment. The broadcast signal in this exemplary embodiment may carry a channel having one piece of channel loop information, and a channel having a plurality of pieces of channel loop information. As shown in FIG. 9, a VCT 91 of a first channel may include one piece of channel loop information 92. On the other hand, a VCT 93 of a second channel may include a plurality of pieces of channel loop information such as first channel loop information 94 and second channel loop information 95. For example, three or more pieces of channel loop information may be provided per channel. The plurality of pieces of channel loop information 94, 95 may be continuously provided in a channel loop of the VCT 93 of the second channel.

Figure 10:
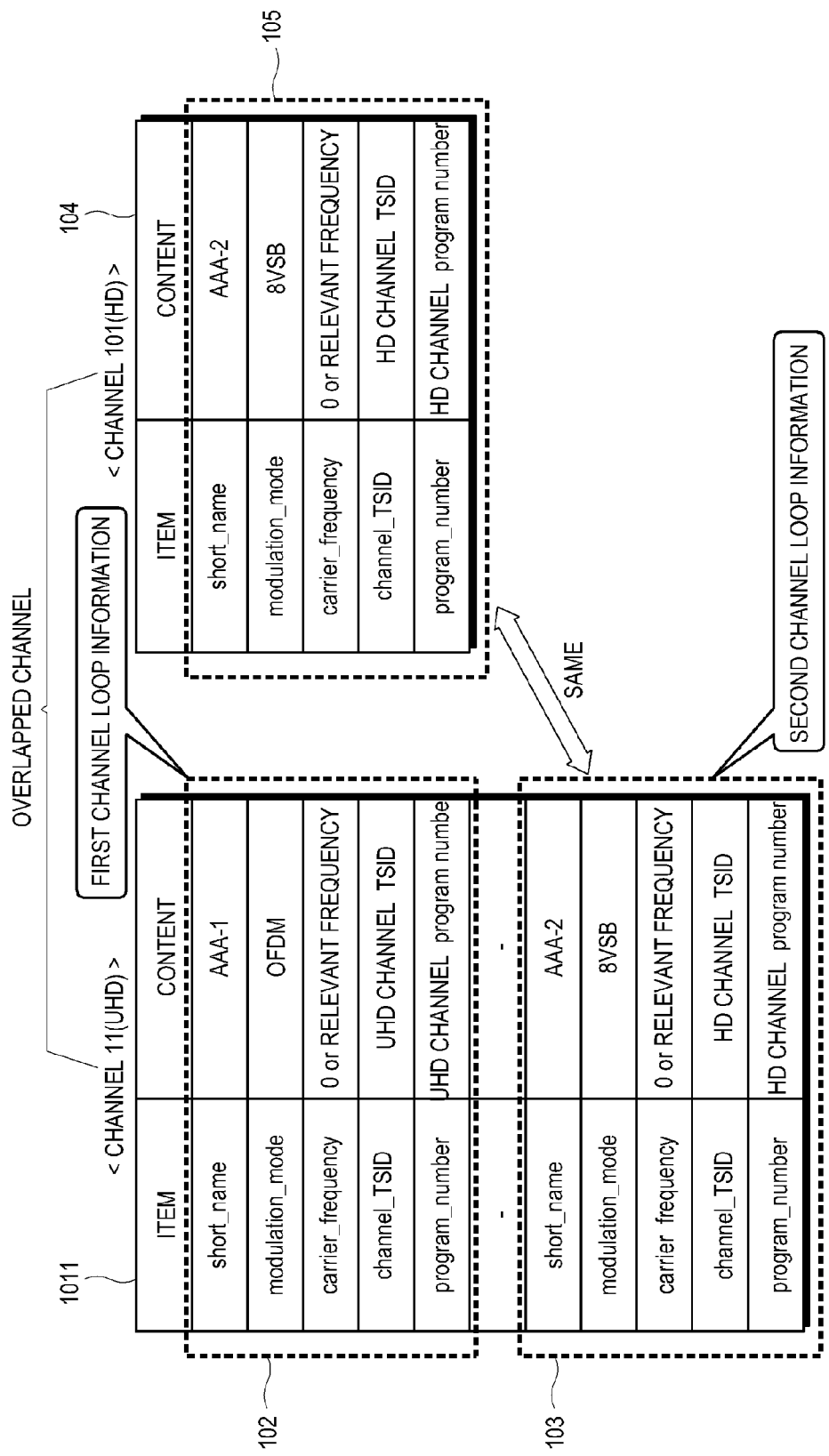
FIG. 10 shows examples of the channel loop information of the overlapped channel according to an exemplary embodiment.

FIG. 10 shows examples of the channel loop information of the overlapped channel according to an exemplary embodiment. In this exemplary embodiment, for example, suppose that the channel of '11' and the channel of '101' are the overlapped channels and the channel of '11' provides a broadcast content having a resolution of UHD and the channel of '101' provides the same broadcast content having a resolution of HD. As shown in FIG. 10, a VCT 1011 of the channel of '11' may contain first channel loop information 102. The first channel loop information 102 is the channel loop information corresponding to the channel of '11'. In detail, the corresponding channel has a short_name of 'AAA-1', a modulation_mode of the broadcast signal for the corresponding channel is OFDM, the carrier_frequency is 0 or a corresponding frequency, channel_TSID is transport stream identifier (TSID) of a UHD channel, and a program_number is a program number of the UHD channel.

Likewise, a VCT 104 of the channel of '101' may contain channel loop information 105. The channel of '101' has the channel loop information 105, in which specifically the corresponding channel has a short_name of AAA-2, a modulation_mode of the broadcast signal for the corresponding channel is 8VSB, the carrier_frequency is 0 or a corresponding frequency, channel_TSID is TSID of a HD channel, and a program_number is a program number of the HD channel.

The VCT 1011 of the channel of '11' may further include the second channel loop information 103 together with the first channel loop information 102. As shown in FIG. 10, the second channel loop information 103 of the channel of '11' is the same as the channel loop information 105 of the channel of '101'. That is, the broadcast signal in this exemplary embodiment may further have the same channel loop information 103 as the channel loop information 105 of another channel (e.g. the channel of '101') corresponding to the overlapped channel, in addition to the channel loop information 102 of the corresponding channel (e.g., the channel of '11').

Referring back to FIG. 7, the display apparatus 11 checks the VCT of the corresponding channel at operation S72, and determines whether there is a plurality of pieces of channel loop information included in the VCT of the corresponding channel at operation S73. For example, as shown in FIG. 9, if the VCT 93 of the second channel contains the first channel loop information 94 and the second channel loop information 95, it is determined that there is the plurality of pieces of channel loop information.

If the VCT of the corresponding channel includes the plurality of pieces of channel loop information ('Yes' in the operation S73), at operation S74 the display apparatus 11 determines whether certain channel loop information among the plurality of pieces of channel loop information is the same as the channel loop information of a different channel. For example, as shown in FIG. 10, if the second channel loop information 103 of the channel of '11' is the same as the channel loop information 105 of the channel of '101', it is determined that the certain channel loop information is the same as the channel loop information of the different channel.

If the certain channel loop information is the same as the channel loop information of the different channel ('Yes' in the operation S74), at operation S75 the display apparatus 11 determines the corresponding channels as the overlapped channels. For example, as shown in FIG. 10, if the second channel loop information 103 of the channel of '11' is the same as the channel loop information 105 of the channel of '101', the channel of '11' and the channel of '101' are determined as the overlapped channels. FIG. 10 shows that the channel (e.g., the channel of '11') having a higher resolution additionally involves the channel loop information of the channel (e.g., the channel of '101') having a lower resolution, but not limited thereto. Alternatively, the channel loop information of the channel (e.g., the channel of '101') having a lower resolution may additionally involve the channel loop information of the channel (e.g., the channel of '11') having a higher resolution. Like this, according to an exemplary embodiment, the channel loop information of the different channel corresponding to the overlapped channel is added to the channel information of the certain channel, and therefore the overlapped channel is determined with high convenience and reliability.

Figure 11:
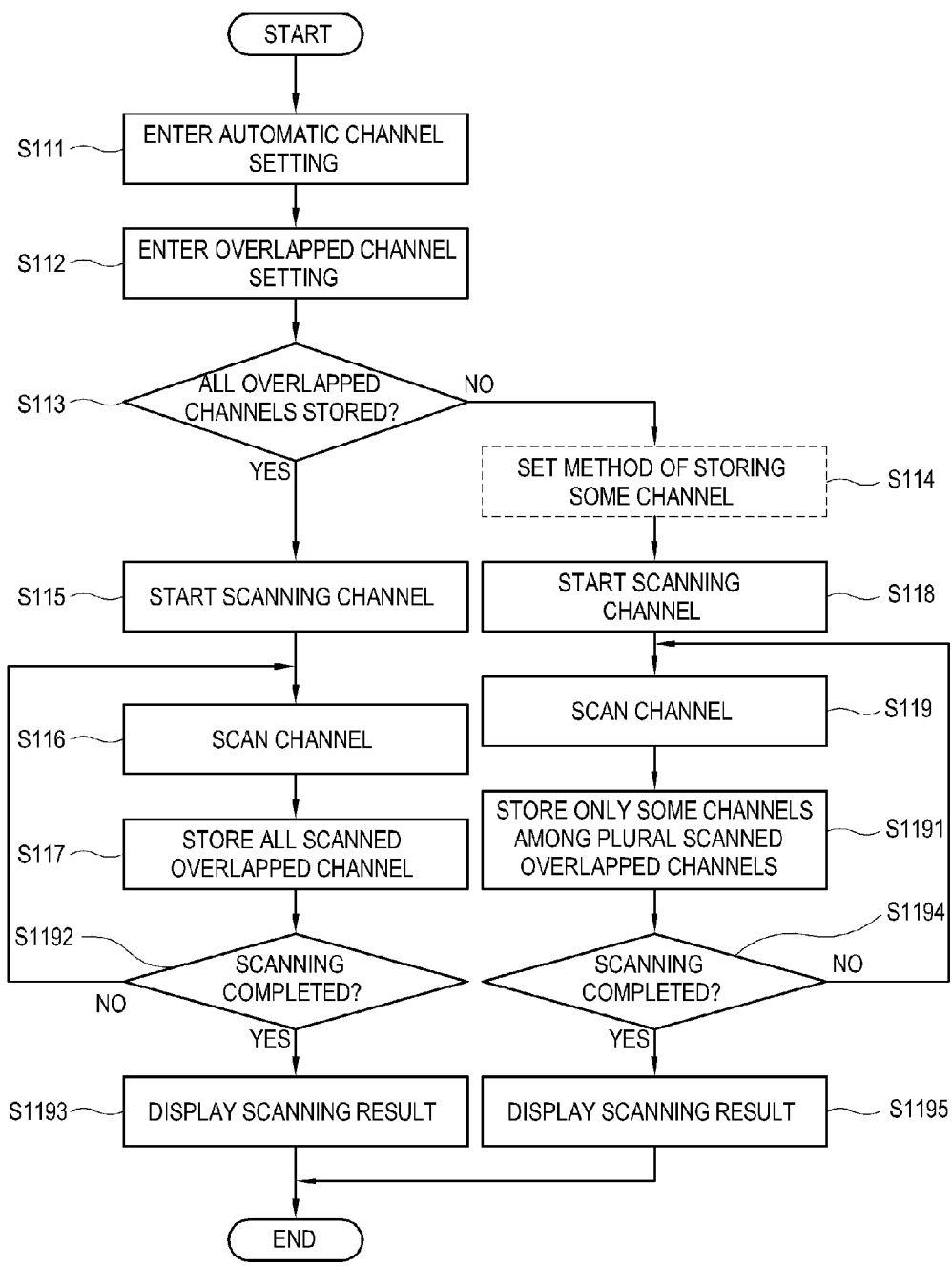
FIG. 11 is a flowchart showing a control method of the display apparatus according to an exemplary embodiment.

FIG. 11 is a flowchart showing a control method of the display apparatus according to an exemplary embodiment. At operation S111, the display apparatus 11 enters automatic channel setting. In this exemplary embodiment, the automatic channel setting is to scan all the channels of the broadcast signal received in the display apparatus 11, and store the information of the scanned channel. The display apparatus 11 may make the storage 54 store the information of the channel obtained by performing the automatic channel setting. The display apparatus 11 may draw up a channel list of channels selectable by a user based on the information of the channel obtained by performing the automatic channel setting, and store the channel list in the storage 54. In the channel list, the information about the plurality of selectable channels may be listed in sequence. The display apparatus 11 receives a broadcast signal of a channel adjacent to the current channel in the channel list, when a user selects a channel-up (+) or a channel-down (−) through arrow keys or the like of the remote controller 12 while viewing a broadcast content of a certain channel, based on the stored channel list.

Figure 12:
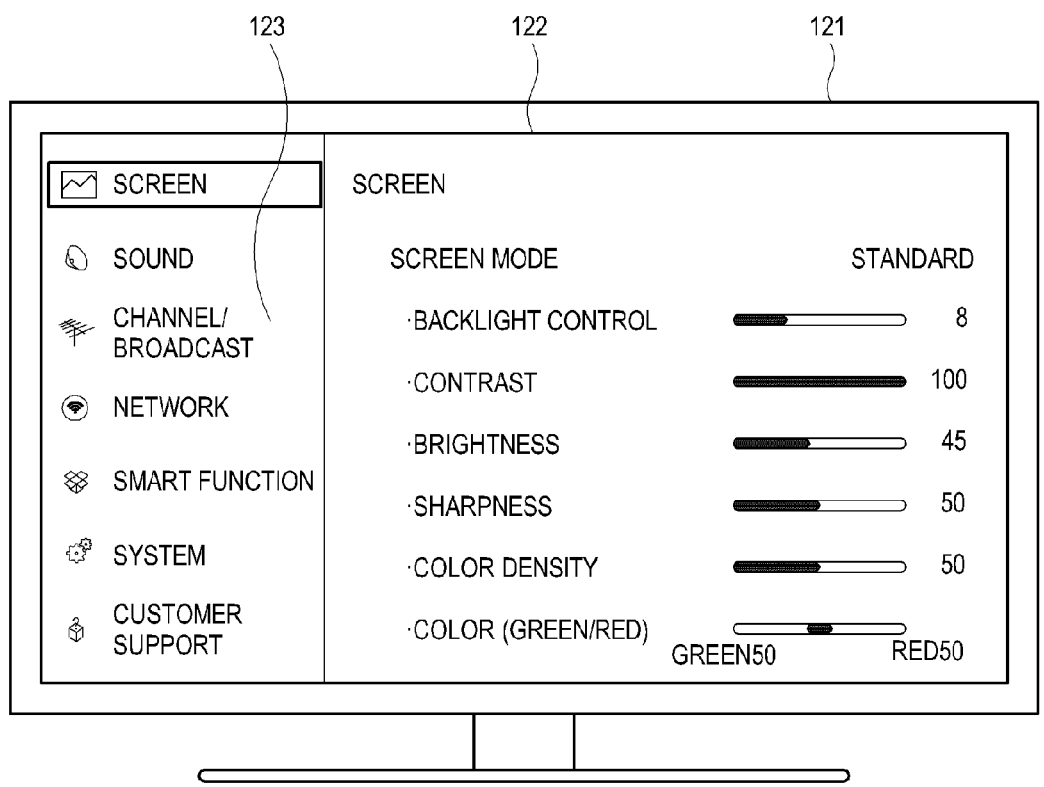
FIGS. 12 and 13 show a user interface (UI) on which automatic channel setting is performed in response to a user's input.
Figure 13:
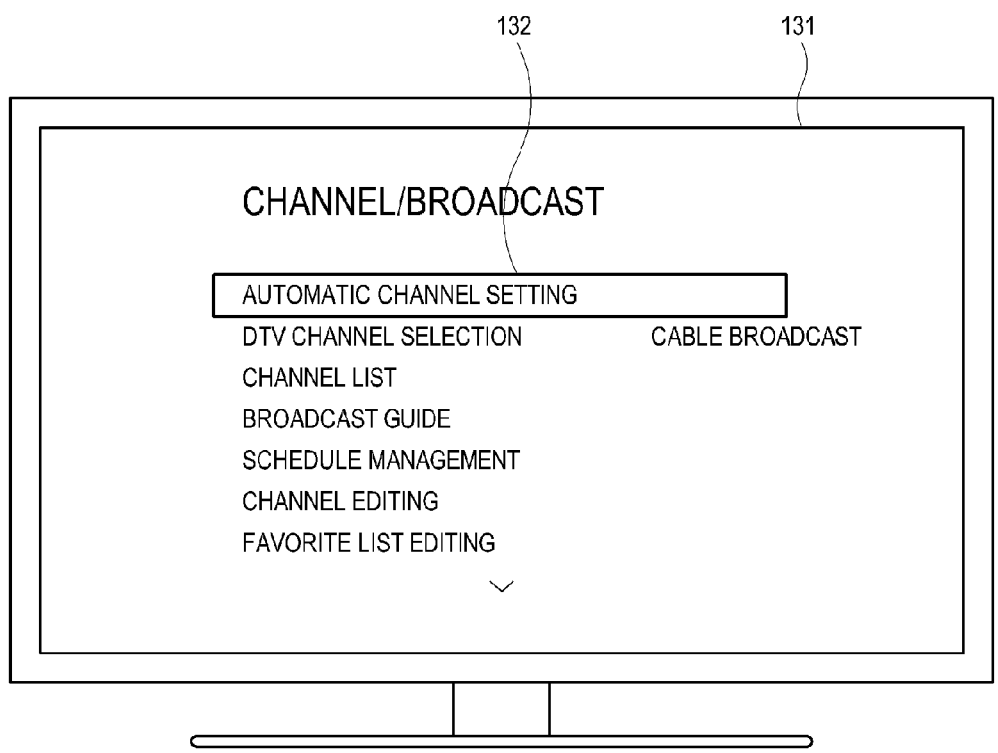

The automatic channel setting of the operation S111 may be automatically performed when a preset condition is satisfied. For example, the display apparatus 11 may perform the automatic channel setting periodically. Alternatively, the display apparatus 11 may perform the automatic channel setting when it is powered on. Alternatively, the display apparatus 11 may perform the automatic channel setting in response to a user's input. FIGS. 12 and 13 show a user interface (UI) on which the automatic channel setting is performed in response to a user's input. The display apparatus 11 displays a UI 122 of a main menu on a screen 121 of the display 23, if a user selects a menu key through the remote controller 12 or the like. As shown in FIG. 12, the UI 122 of the main menu may include a plurality of items, through which settings for a screen, a sound, a channel/broadcast, a network, a smart function, etc. may be selected. If a user selects an item 123 for the channel/broadcast setting through the UI 122 of the main menu, the display apparatus 11 displays a UI 131 for the channel/broadcast setting as shown in FIG. 13. As shown therein, the UI 131 for the channel/broadcast setting may further include a plurality of items for selecting settings about the automatic channel setting, DTV channel setting, a channel list, a broadcast guide, a schedule management, channel editing, favorite list editing, etc. The display apparatus 11 enters the automatic channel setting when a user selects the item 132 for the automatic channel setting through the UI 131 for the channel/broadcast setting.

Figure 14:
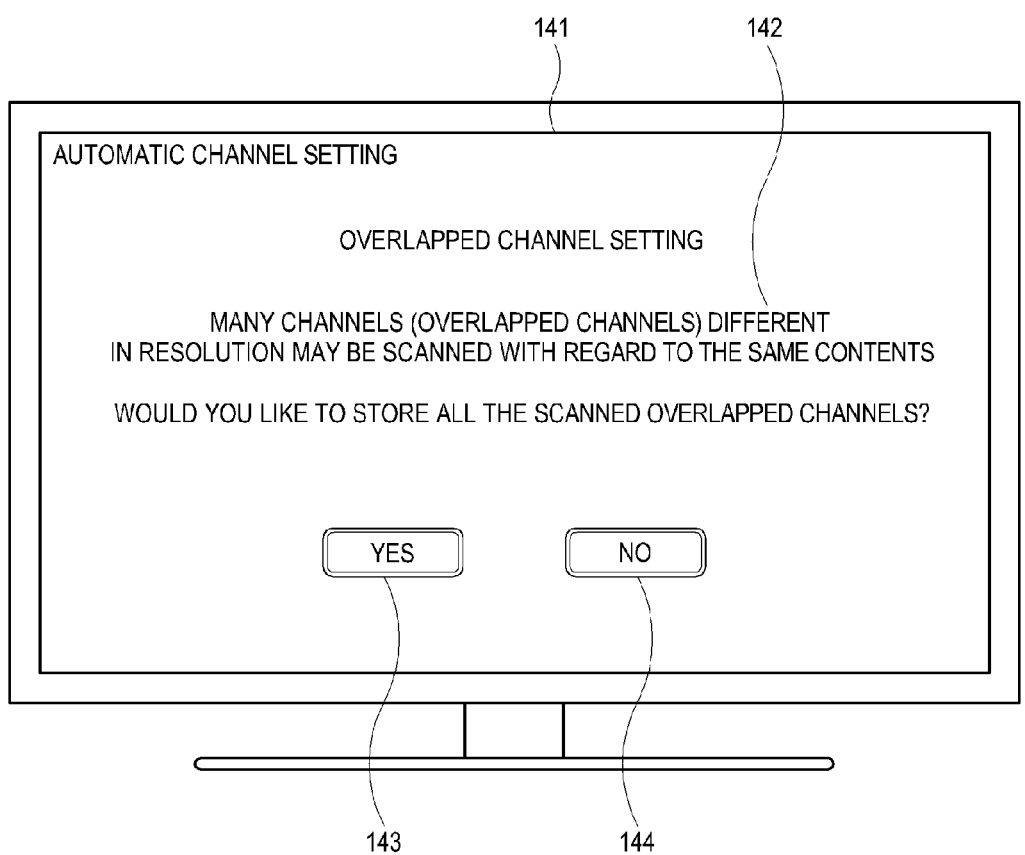
FIGS. 14 and 15 show examples of a UI for overlapped channel setting according to an exemplary embodiment.
Figure 15:
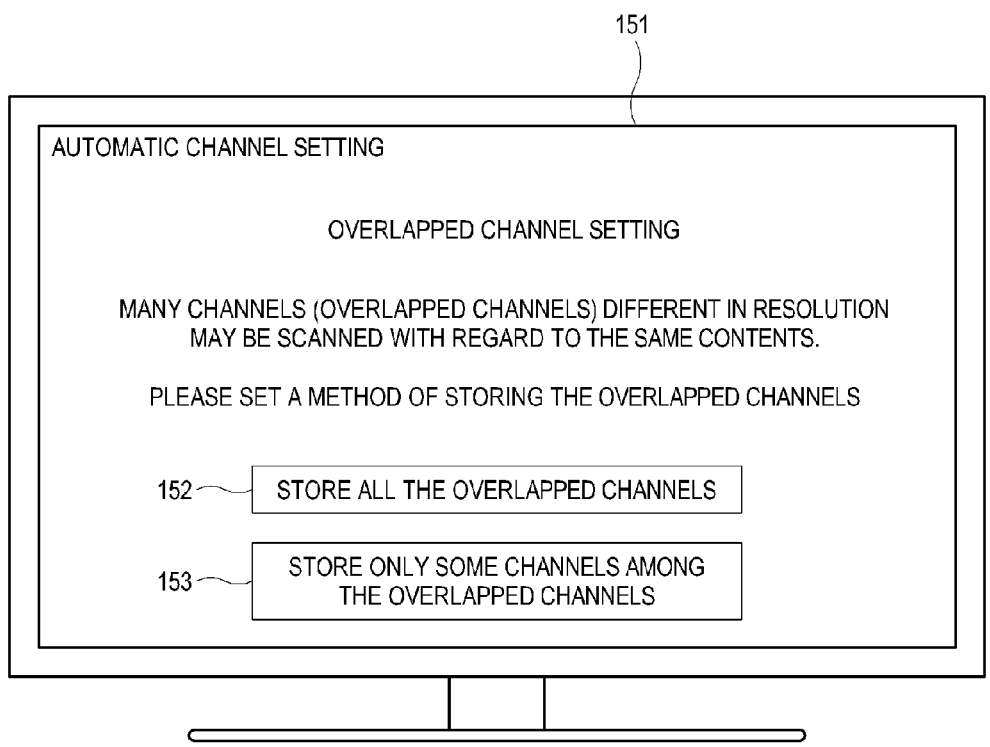

Referring back to FIG. 11, if the automatic channel setting starts at operation S111, the display apparatus 11 enters the overlapped channel setting at operation S112. In the operation S112 of the overlapped channel setting, the display apparatus 11 may display a UI for the overlapped channel setting. FIGS. 14 and 15 show examples of a UI for overlapped channel setting according to an exemplary embodiment. As shown in FIG. 14, a UI 141 for the overlapped channel setting may include a guide message 142 about the overlapped channel setting. For instance, the guide message 142 may contain information that many channels having the same contents but having different resolutions may be scanned. Further, the UI 141 for the overlapped channel setting may ask a user whether to store all the overlapped channels scanned at the automatic channel setting, and include items 143 and 144 for receiving a user's selection about whether to store the overlapped channels. Thus, a user may select the item 143 of 'Yes' to store all the overlapped channels scanned at the automatic channel setting, or select the item 144 of 'No' to store only some overlapped channels scanned at the automatic channel setting. In this exemplary embodiment, storing only some channels among the overlapped channels may mean that only some channels among the overlapped channels are added to the channel list and the other overlapped channels are not added to the channel list.

Alternatively, as shown in FIG. 15, a UI 151 for the overlapped channel setting may guide a user to set a method of storing the overlapped channel, and may include items 152 and 153 for receiving a user's selection about the method of storing the overlapped channel. Thus, a user may select the item 152 of 'store all the overlapped channels' to store all the overlapped channels scanned at the automatic channel setting, or the item 153 of 'store only some channels among many overlapped channels' to store only some channels among the overlapped channels scanned. Thus, according to an exemplary embodiment, user convenience is improved since s/he may easily set the method of storing the overlapped channels through the UI given at the automatic channel setting.

Referring back to FIG. 11, at operation S113 the display apparatus 11 determines whether a user selects all the overlapped channels, which are scanned at the automatic channel setting, to be stored. For example, if a user selects the item 143 of 'Yes' shown in FIG. 14 or the item 152 of 'store all the overlapped channels' shown in FIG. 15, the display apparatus 11 determines that all the overlapped channels scanned at the automatic channel setting are selected to be stored ('Yes' at operation S113). On the other hand, if a user selects the item 144 of 'No' shown in FIG. 14 or the item 153 of 'store only some channels among many overlapped channels' shown in FIG. 15, the display apparatus 11 determines that only some channels among the overlapped channels scanned at the automatic channel setting are selected to be stored ('No' at operation S113).

Figure 16:
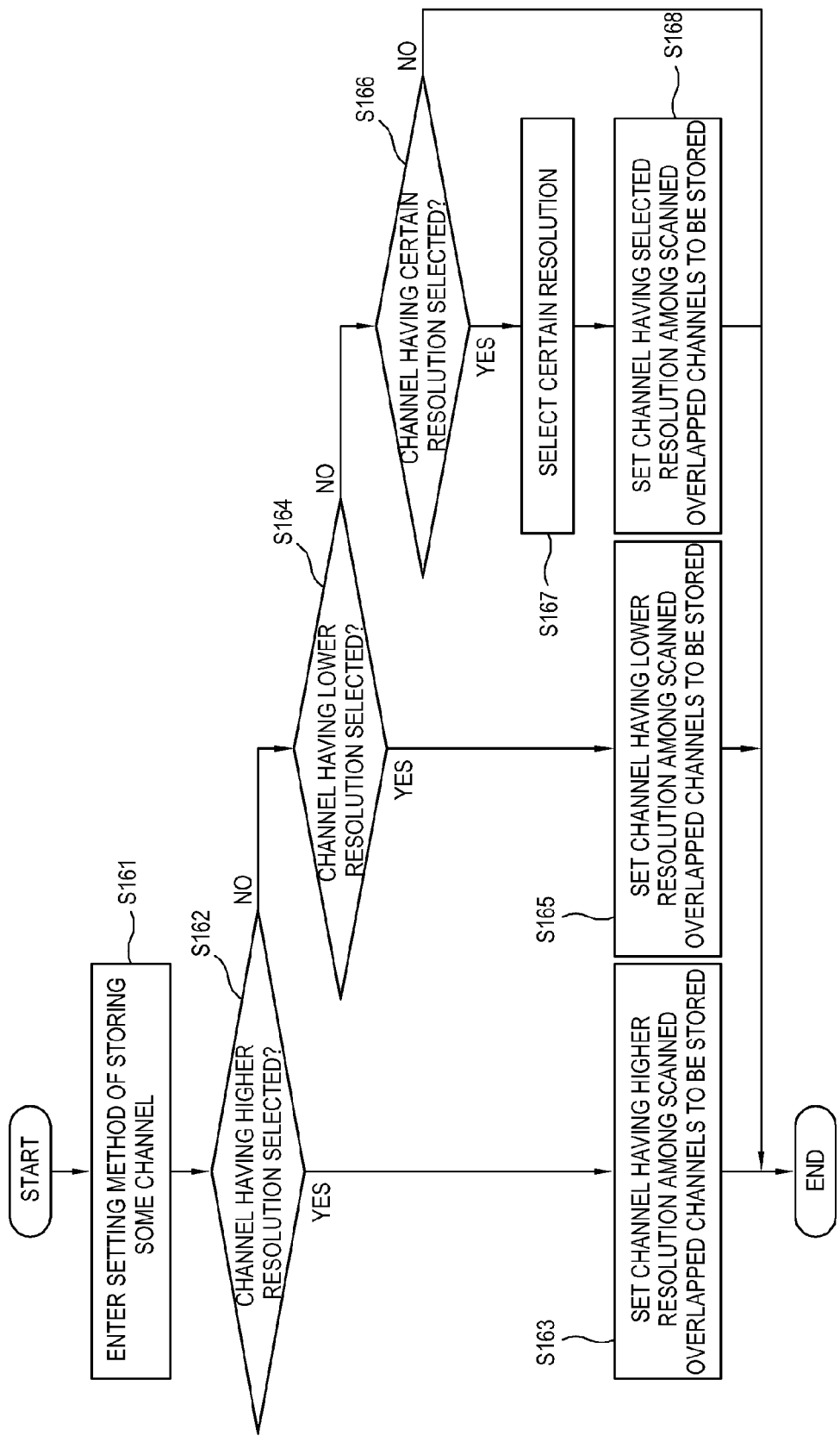
FIG. 16 is a flowchart showing a method of storing some channels among overlapped channels scanned at the automatic channel setting according to an exemplary embodiment.
Figure 17:
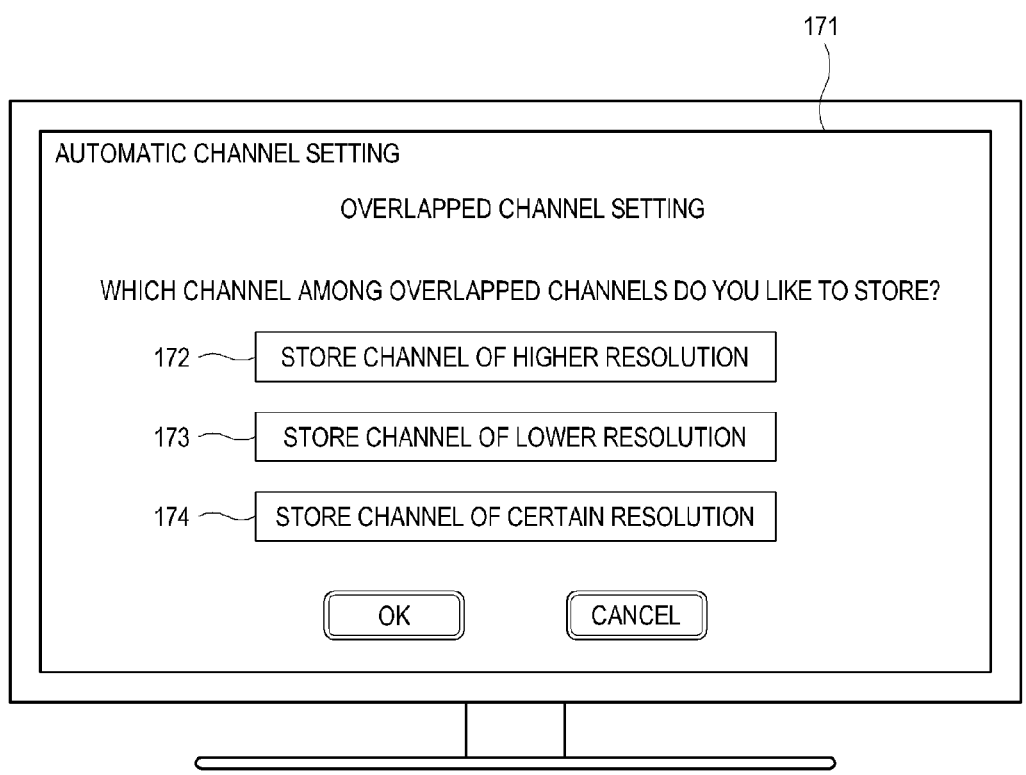
FIG. 17 shows an example of a UI for setting the method of storing some channels among the overlapped channels according to an exemplary embodiment.

If a user selects an item to store only some channels among the overlapped channels, which are scanned at (during) the automatic channel setting, ('No' at operation S113), at operation S114 the display apparatus 11 may be set with the method of storing some channels among the overlapped channels scanned at the automatic channel setting. The operation S114 of FIG. 11 may be omitted according to an exemplary embodiment. FIG. 16 is a flowchart showing the method of storing some channels among the overlapped channels scanned at the automatic channel setting according to an exemplary embodiment. As shown in FIG. 16, at operation S161, the display apparatus 11 enters setting for the method of storing some channels among the overlapped channels scanned at the automatic channel setting. The display apparatus 11 may display a UI for setting the method of storing some channels among the overlapped channels. FIG. 17 shows an example of a UI for setting the method of storing some channels among the overlapped channels according to an exemplary embodiment. As shown in FIG. 17, a UI 171 for setting the method of storing some channels among the overlapped channels may include items 172, 173 and 174 for respectively selecting channels having a high resolution, a low resolution and a certain resolution as the channels to be stored among the overlapped channels.

Referring to FIG. 16, if an item 172 corresponding to the channel having the high resolution is selected in the UI 171 shown in FIG. 17 ('Yes' at operation S162), at operation S163 the display apparatus 11 sets the channel having the high resolution to be stored among the overlapped channels scanned at the automatic channel setting. For example, between the overlapped channels as shown in FIG. 10, i.e. a channel of '11' having a UHD resolution and a channel of '101' having an HD resolution, only the channel of '11' having the UHD resolution is stored, but the channel of '101' having the HD resolution is not stored. Thus, according to an exemplary embodiment, user convenience is more improved since s/he may easily set some channels to be stored among the overlapped channels through the UI given at the automatic channel setting.

Referring to FIG. 16, if an item 173 corresponding to the channel having the low resolution is selected in the UI 171 shown in FIG. 17 ('Yes' at operation S164), at operation S165 the display apparatus 11 sets the channel having the low resolution to be stored among the overlapped channels scanned at the automatic channel setting. On the other hand, if an item 174 corresponding to the channel having a certain resolution is selected in the UI 171 shown in FIG. 17 ('Yes' at operation S166), at operation S167 the display apparatus 11 allows a user to select the certain resolution, and at operation S168 the display apparatus 11 sets the channel having the selected resolution.

Figure 18:
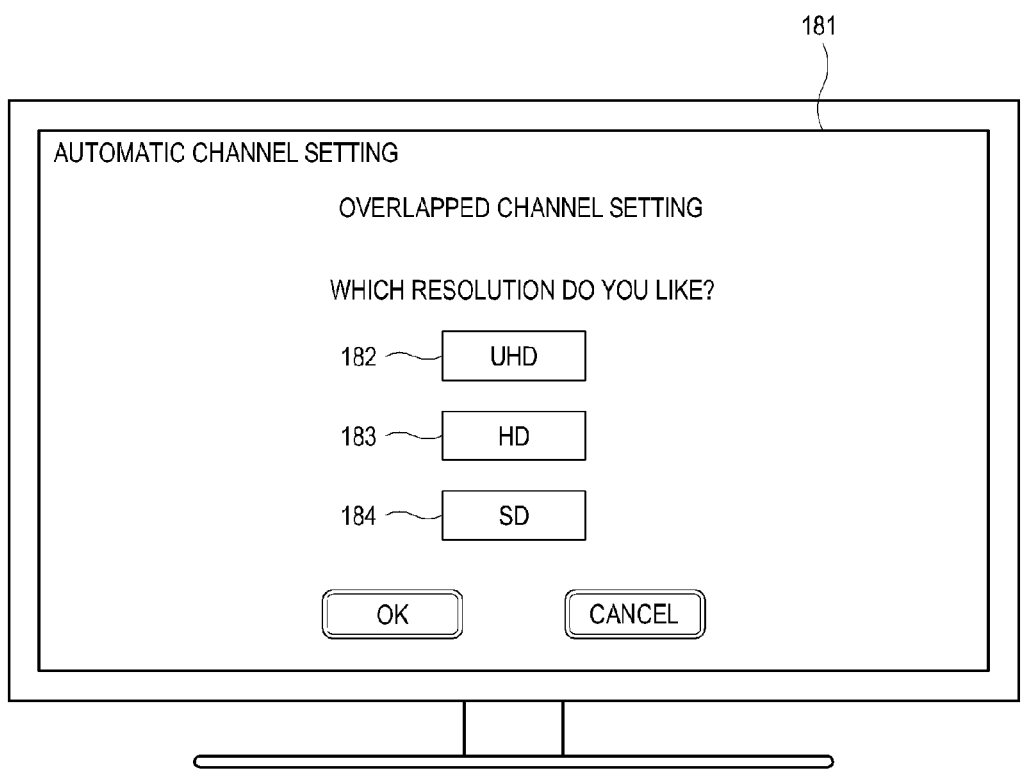
FIG. 18 shows another example of a UI for channel setting having a certain resolution among the overlapped channels according to an exemplary embodiment.

FIG. 18 shows another example of a UI for channel setting having a certain resolution among the overlapped channels according to an exemplary embodiment. As shown in FIG. 18, a UI 181 for setting a channel having a certain resolution among the overlapped channels may include items 182, 183 and 184 for respectively selecting UHD, HD and standard definition (SD) resolutions as a certain resolution of a channel to be stored among the overlapped channels.

Referring back to FIG. 16, if a user selects one among a plurality of items 182, 183 and 184 in the UI 181 shown in FIG. 18 at operation S167, the display apparatus 11 sets a channel having the certain resolution corresponding to the selected item 182, 183 or 184 to be stored among the overlapped channels scanned at the automatic channel setting (operation S168). Thus, according to an exemplary embodiment, user convenience is more improved since s/he may easily select the resolution of some channels to be stored among the overlapped channels in accordance with his/her tastes through the UI given at the automatic channel setting.

Figure 19:
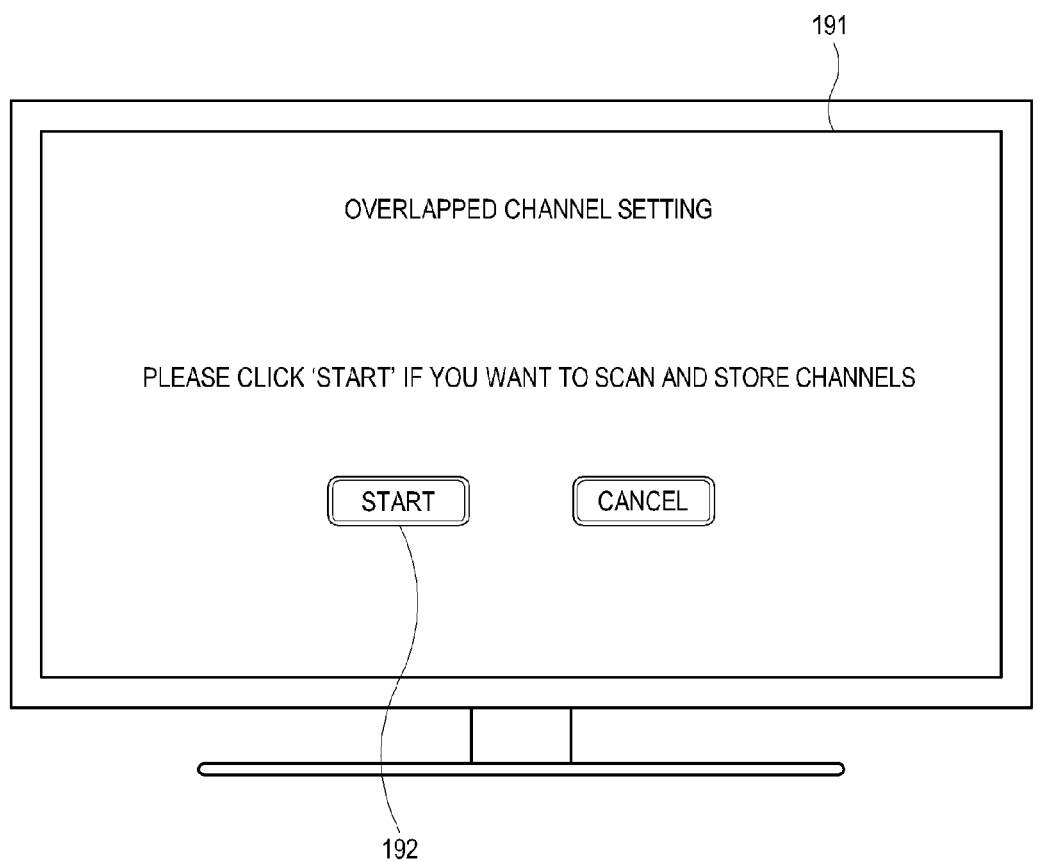
FIG. 19 shows an example of a UI for input of a channel scan start according to an exemplary embodiment.

Referring back to FIG. 11, if all the overlapped channels scanned at (during) the automatic channel setting are selected to be stored ('Yes' at operation S113), at operation S115 the display apparatus 11 starts scanning the channels for the automatic channel setting. Before starting scanning the channels, the display apparatus 11 may receive a user's input for the channel scan start. FIG. 19 shows an example of a UI for input of a channel scan start according to an exemplary embodiment. A UI 191 for input of the channel scan start may include an item 192 for allowing a user to okay the channel scan start. If a user selects the item 192 in the UI 191, the display apparatus 11 starts scanning the channels for the automatic channel setting.

Figure 20:
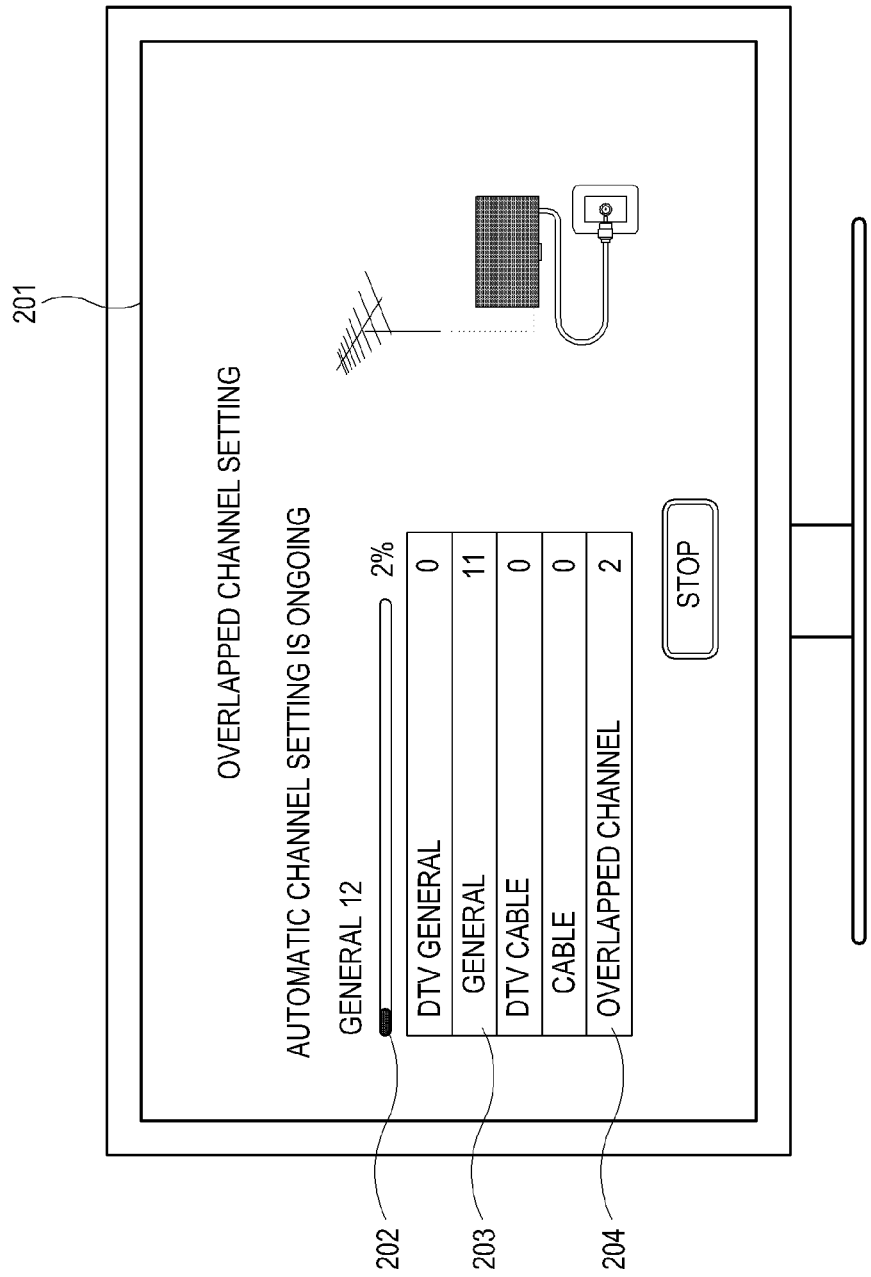
FIG. 20 shows an example of a UI for guiding a scanning state while channels are scanned according to an exemplary embodiment.

Referring back to FIG. 11, at operation S116 the display apparatus 11 scans the channels for the automatic channel setting. The display apparatus 11 may display a UI for guiding a scanning state while the channels are scanned. FIG. 20 shows an example of a UI for guiding a scanning state while channels are scanned according to an exemplary embodiment. The UI 201 for guiding the scanning state may include a progress state bar 202 showing how far the scanning is progressed, and information 203 showing the kinds, the number and the like of channels scanned so far. Further, the UI 201 for guiding the scanning state according to an exemplary embodiment may additionally include information 204 showing the number of overlapped channels scanned so far. Thus, according to an exemplary embodiment, user convenience is more improved since s/he may directly get information about the scanned overlapped channels while the channels are scanned at the automatic channel setting.

Figure 21:
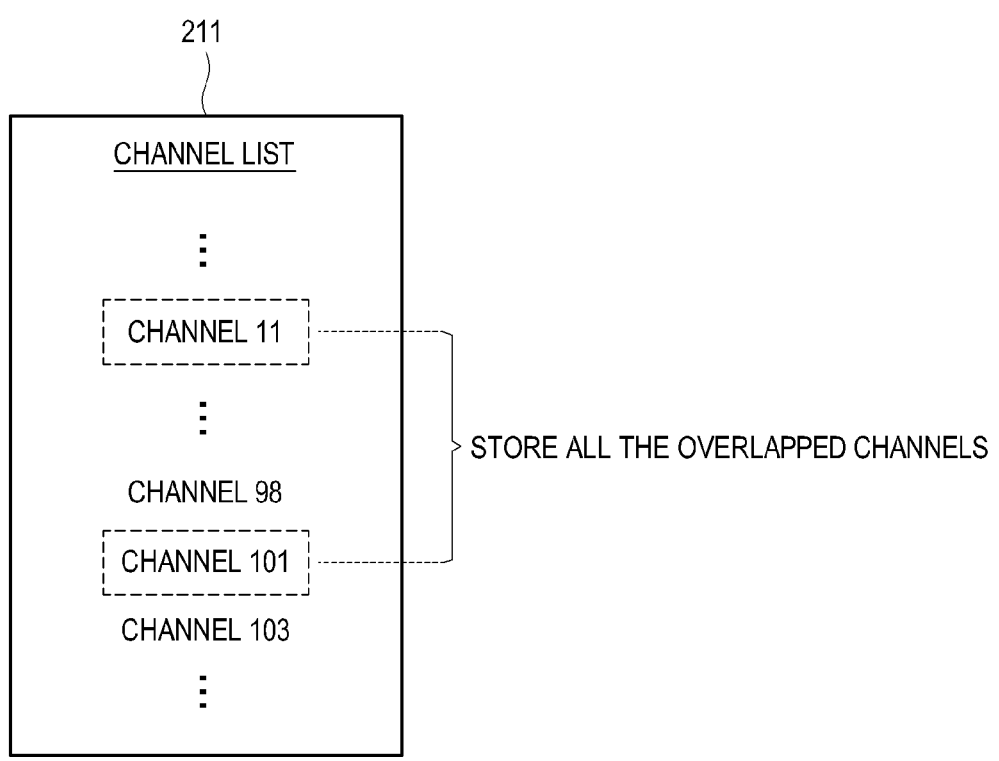
FIG. 21 shows an example of a channel list of storing all the overlapped channels according to an exemplary embodiment.

Referring to FIG. 11, if the overlapped channels are scanned, at operation S117 the display apparatus 11 stores all the overlapped channels in accordance with settings of a user. In other words, the display apparatus 11 adds all the scanned overlapped channels to the channel list. FIG. 21 shows an example of a channel list of storing all the overlapped channels according to an exemplary embodiment. As shown in FIG. 21, for example, if the channel of '11' and the channel of '101' are the overlapped channels, the display apparatus 11 adds both the channel of '11' and the channel of '101' to a channel list 211. In this case, if a user selects channel-up (+) through arrow keys or the like of the remote controller 12 while viewing a broadcast content corresponding to a channel of '98' or selects channel-down (−) while viewing a broadcast content corresponding to a channel of '103' in the future, the display apparatus 11 may receive a broadcast signal of the channel of '101', thereby providing a broadcast content of the corresponding channel.

Figure 22:
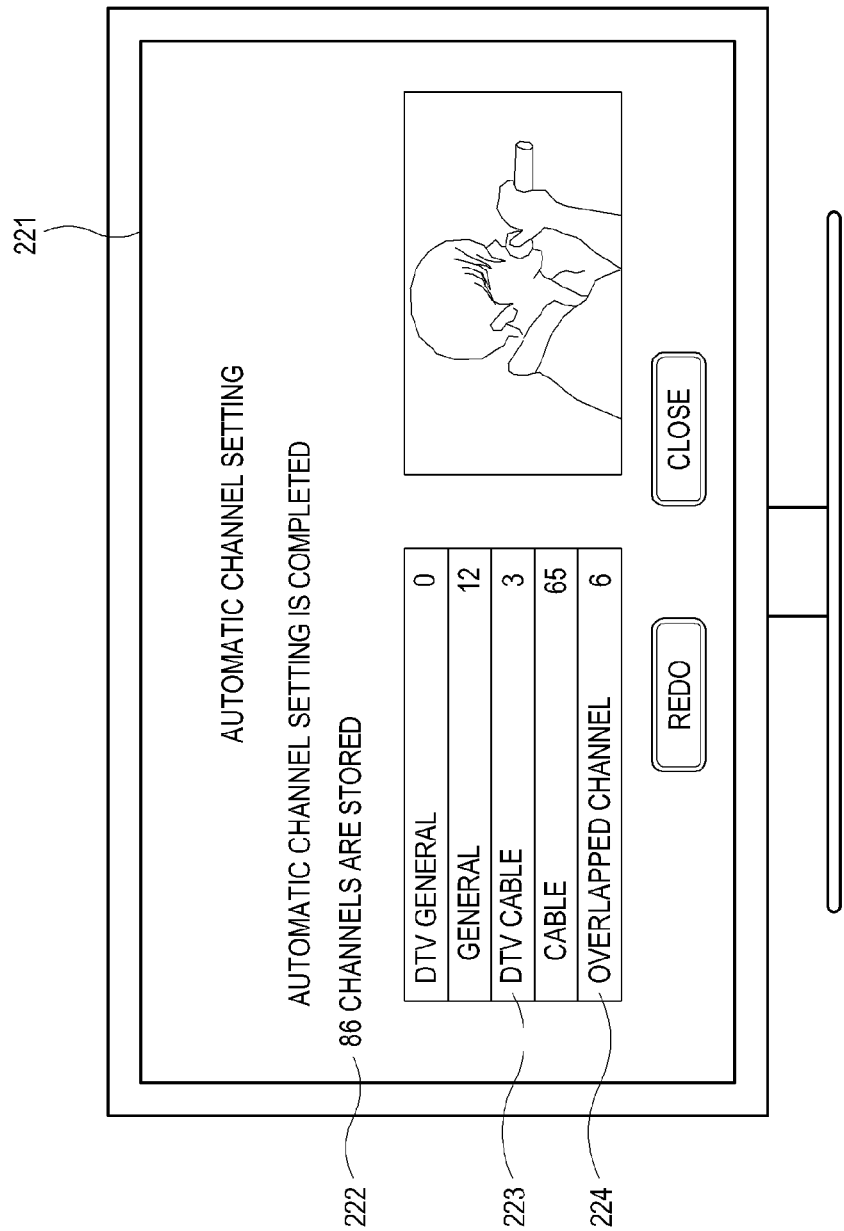
FIG. 22 shows an example of a UI for a scan result of the automatic channel setting according to an exemplary embodiment.

Next, at operation S1192 the display apparatus 11 determines whether the scan is completed with regard to all the channels, and returns to the operation S116 if the scan is not completed. On the other hand, if the scan is completed with regard to all the channels ('Yes' at operation S1192), at operation S1193 the display apparatus 11 displays a scan result of the automatic channel setting. FIG. 22 shows an example of a UI for a scan result of the automatic channel setting according to an exemplary embodiment. A UI 221 of showing the scan result of the automatic channel setting may include information 222 about a total number of scanned channels, and information 223 about the kinds, number and the like of scanned channels. Further, the UI 221 of showing the scan result of the automatic channel setting according to an exemplary embodiment may further include information 224 about a total number or the like of scanned overlapped channels. Thus, according to an exemplary embodiment, user convenience is improved since s/he may be directly informed of total scanned overlapped channels after the automatic channel setting.

Referring back to FIG. 11, if some channels among the overlapped channels scanned at the automatic channel setting are selected to be stored ('No' at operation S113), at operation S118 the display apparatus 11 starts scanning the channels for the automatic channel setting. To start scanning the channels, the display apparatus 11 may for example receive a user's input for the channel scan start through the UI 191 shown in FIG. 19. Next, at operation S119, the display apparatus 11 scans the channels for the automatic channel setting. For example, the display apparatus 11 may display the UI 201 for guiding the scanning state as shown in FIG. 19 while the channel is scanned.

Figure 23:
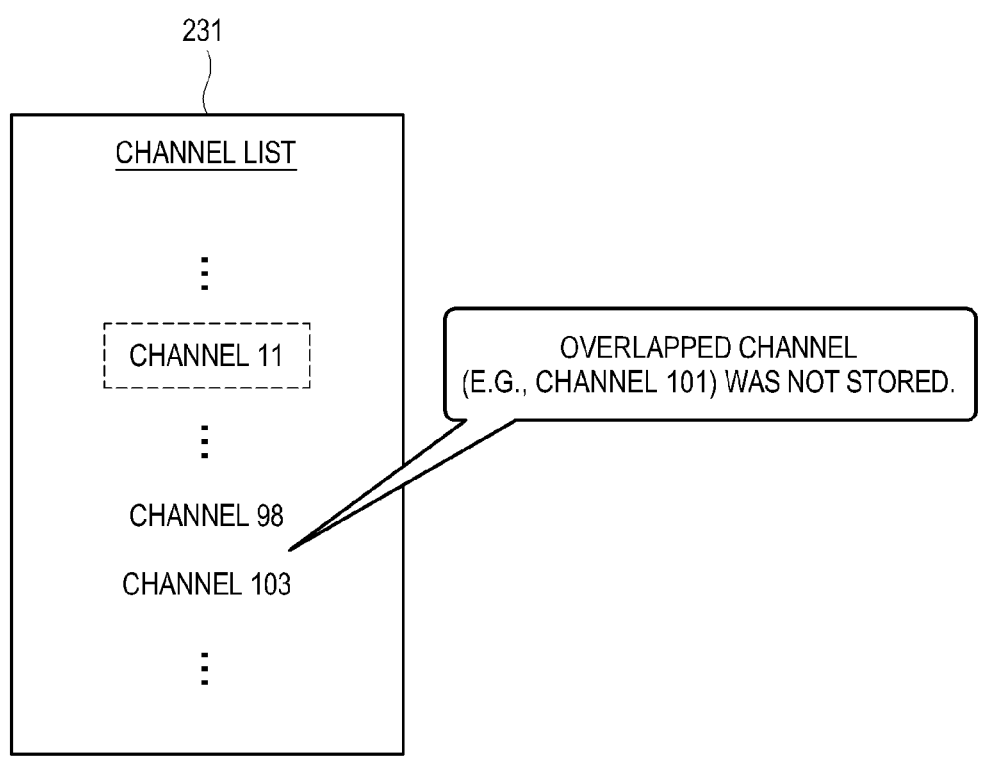
FIG. 23 shows an example of a channel list of storing some channels among the overlapped channels according to an exemplary embodiment.

Next, if the overlapped channels are scanned, at operation S1191 the display apparatus 11 stores only some channels among the scanned overlapped channels in accordance with settings of a user. That is, the display apparatus 11 adds only some channels set to be stored among the scanned overlapped channels to the channel list. FIG. 23 shows an example of a channel list of storing some channels among the overlapped channels according to an exemplary embodiment. As shown in FIG. 23, for example, if the channel of '11' (having the UHD resolution) and the channel of '101' (having the HD resolution) are the overlapped channels and the channels having the high resolution are set to be stored, the display apparatus 11 adds only the channel of '11' having the high resolution '11' to the channel list 231 without adding the channel of '101' having the low resolution to the channel list 231. In this case, if a user selects channel-up (+) through arrow keys or the like of the remote controller 12 while viewing a broadcast content corresponding to a channel of '98' in the future, the display apparatus 11 skips the channel of '101' and receives a broadcast signal of a channel of '103', thereby providing a broadcast content of the corresponding channel. If a user selects channel-down (−) while viewing a broadcast content corresponding to the channel of '103' in the future, the display apparatus 11 skips the channel of '101' and receives a broadcast signal of a channel of '98', thereby providing a broadcast content of the corresponding channel.

Next, at operation S1194, the display apparatus 11 checks whether the scan is completed with regard to all the channels, and returns to the operation S119 if the scan is not completed. If the scan is completed with regard to all the channels ('Yes' at operation S1194), at operation S1195 the display apparatus 11 displays a scan result of the automatic channel setting. For example, the display apparatus 11 may display a UI 221 of showing the scan result of the automatic channel setting as shown in FIG. 22.

Figure 24:
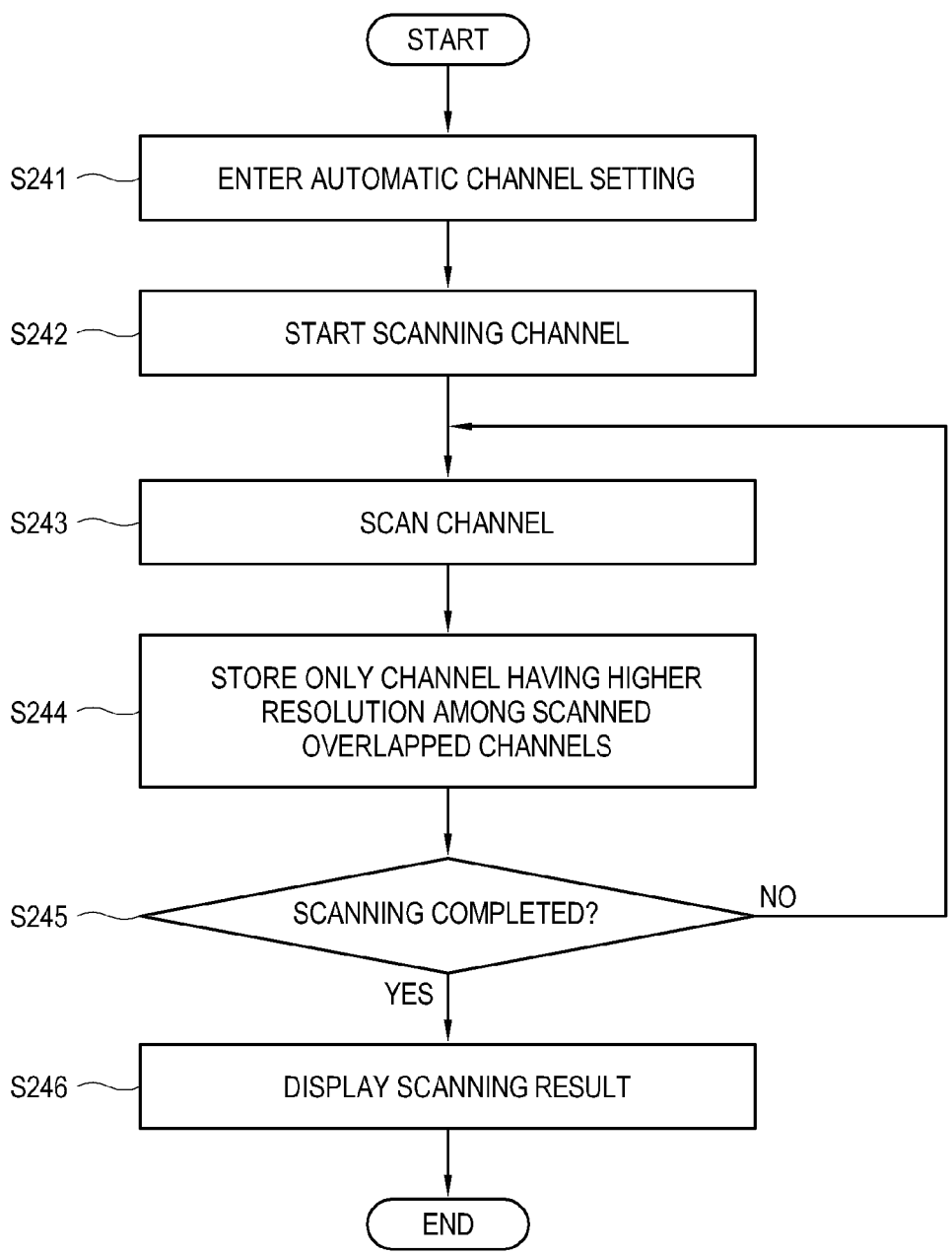
FIG. 24 is a flowchart showing a control method of the display apparatus according to an exemplary embodiment.

FIG. 24 is a flowchart showing a control method of the display apparatus according to an exemplary embodiment. In describing the control method of the display apparatus shown in FIG. 24, the same or similar operations as those of the control method of the display apparatus described with reference to FIG. 11 will be omitted. In this exemplary embodiment, the control method of the display apparatus stores the overlapped channels in accordance not according to a user's input but instead with respect to preset settings.

First, at operation S241 the display apparatus 11 enters the automatic channel setting. Next, at operation S242 the display apparatus 11 starts scanning the channel for the automatic channel setting. Next, at operation S243 the display apparatus 11 scans channels for the automatic channel setting. Next, if there are overlapped channels while the channels are scanned, at operation S244 the display apparatus 11 stores only the channels having the high (highest) resolution among the scanned overlapped channels. Next, at operation S245, the display apparatus 11 checks whether the scan is completed with regard to all the channels, and returns to the operation S243 if the scan is not completed. If the scan is completed with regard to all the channels ('Yes' at operation S245), at operation S246 the display apparatus 11 displays a scan result of the automatic channel setting.

As an alternative to the control method of the display apparatus shown in FIG. 24, the display apparatus 11 may store only the channels having the low (lowest) resolution among the scanned overlapped channels. For example, if a first channel having the UHD resolution and a second channel having the HD resolution are scanned as the overlapped channels under the condition that the resolution supported by the display apparatus 11 is up to the HD, the display apparatus 11 may store only the second channel having the supportable HD resolution without storing the first channel having the unsupportable UHD resolution.

Figure 25:
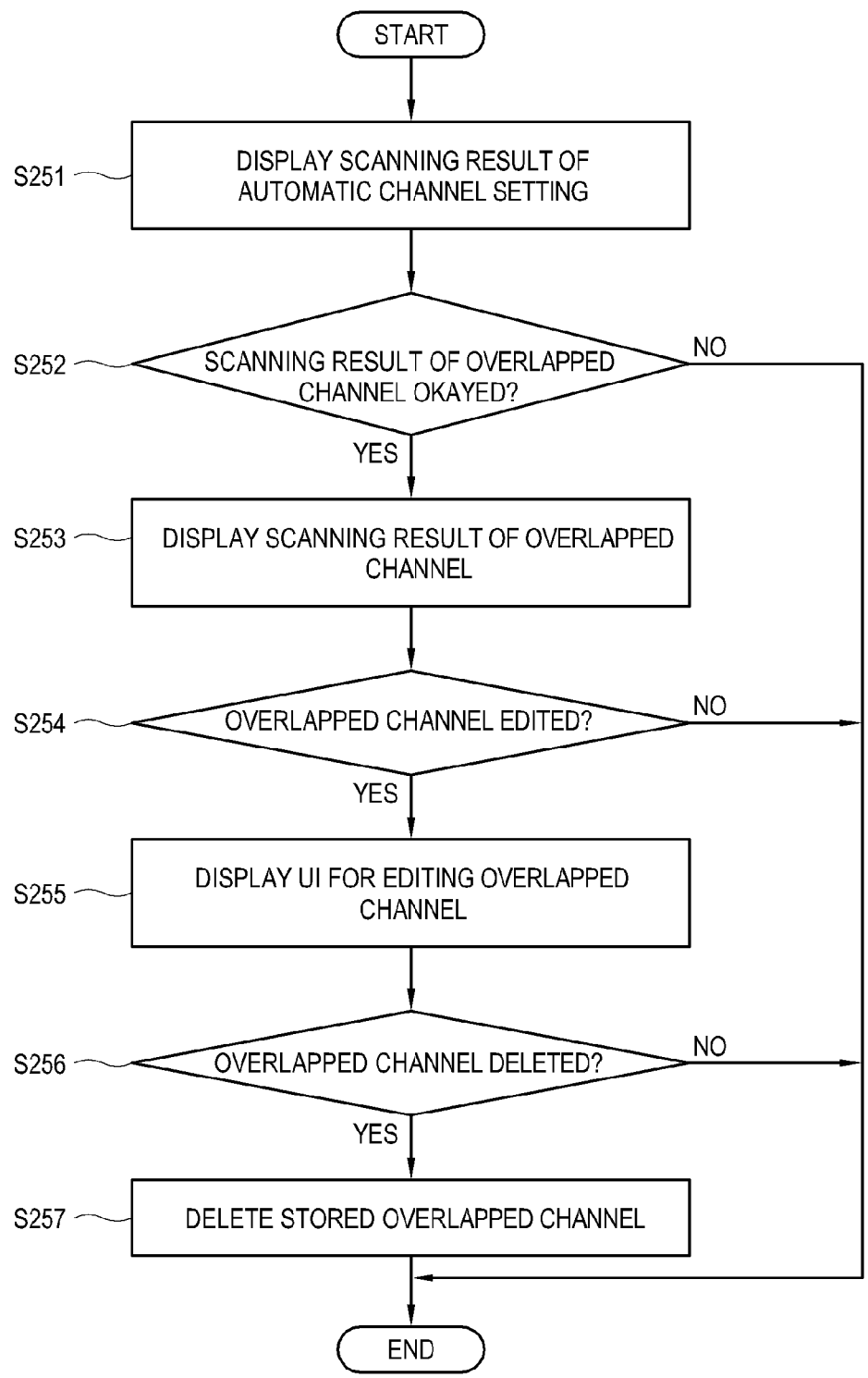
FIG. 25 is a flowchart showing a control method of the display apparatus according to an exemplary embodiment.
Figure 26:
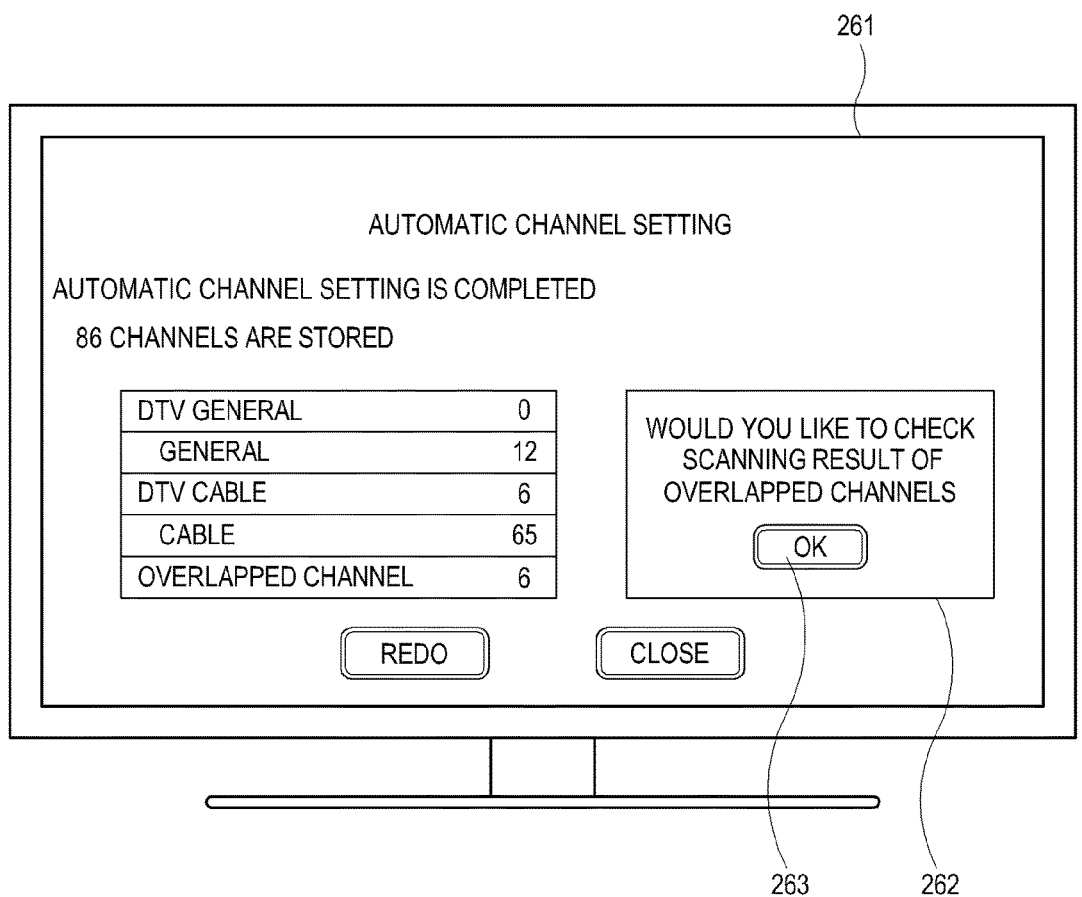
FIG. 26 shows an example of a UI for a scan result of the automatic channel setting according to an exemplary embodiment.

FIG. 25 is a flowchart showing a control method of the display apparatus according to an exemplary embodiment. In this exemplary embodiment, the control method of the display apparatus allows or enables a user to check a detailed scan result of the overlapped channels after the automatic channel setting and edit the stored overlapped channels. Specifically, the embodiment of FIG. 25 allows or enables a user to edit the overlapped channels after storing all the overlapped channels scanned at the automatic channel setting. First, at operation S251, the display apparatus 11 displays a scan result of a previously performed automatic channel setting. FIG. 26 shows an example of a UI for showing a scan result of the automatic channel setting according to an exemplary embodiment. A UI 261 of showing the scan result of the automatic channel setting may include a guide message 262 that asks a user whether to check a detailed scan result of the overlapped channels, and an item 263 that okays checking the detailed scan result of the overlapped channels, in addition to the information showing the kinds, number and the like of total scanned channels, the number of total scanned overlapped channels, etc.

Figure 27:
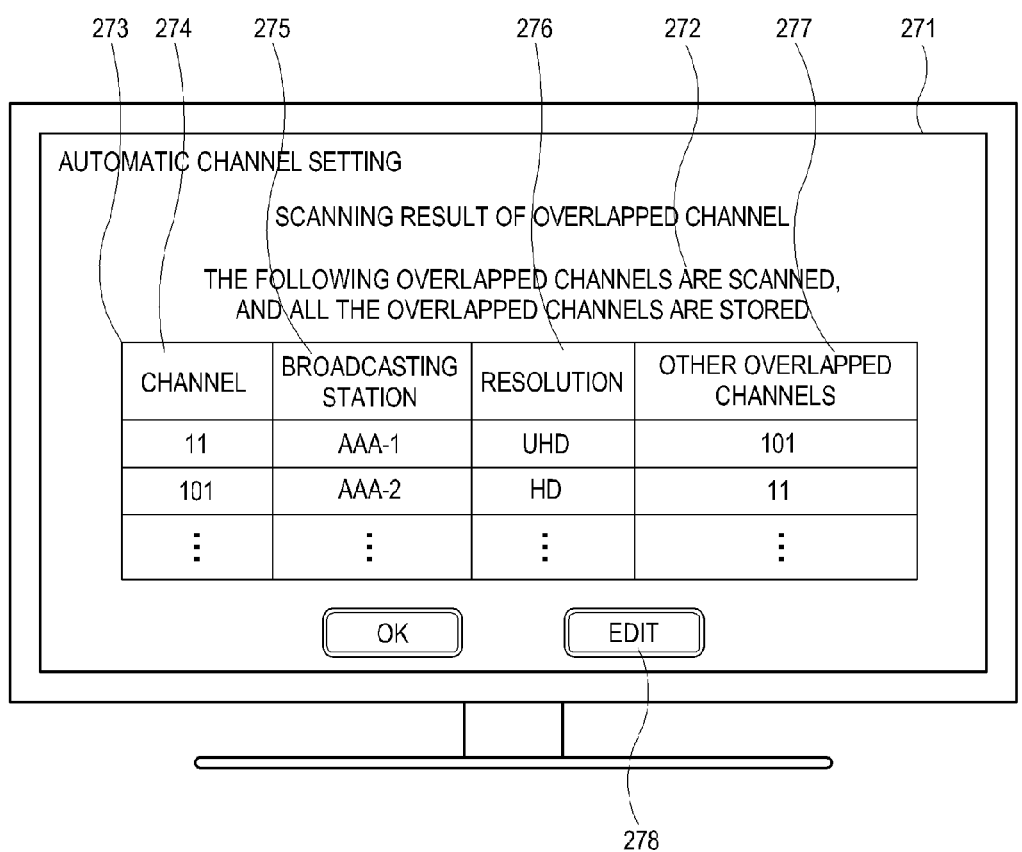
FIG. 27 shows an example of a UI for a detailed scan result of the overlapped channel according to an exemplary embodiment.

Next, at operation S252 of FIG. 25, the display apparatus 11 determines whether a user okays checking the detailed scan result of the overlapped channels through the item 263 of the UI 261 shown in FIG. 26. If a user okays checking the detailed scan result of the overlapped channels ('Yes at operation S252), at operation S253 the display apparatus 11 displays the detailed scan result of the overlapped channel. FIG. 27 shows an example of a UI for showing a detailed scan result of the overlapped channel according to an exemplary embodiment. In this exemplary embodiment, a UI 271 of showing the detailed scan result of the overlapped channels refers to a UI of when all the scanned overlapped channels are stored. The UI 271 showing the detailed scan result of the overlapped channels may include a guide message 272 showing that all the scanned overlapped channels are stored, and a table 273 showing detailed information of the scanned overlapped channels. The table 273 showing the detailed information of the scanned overlapped channels may include information about channel numbers 274 of scanned overlapped channels, broadcasting stations 275 of transmitting broadcasting signals corresponding to the overlapped channels, resolutions 276 of the broadcast contents corresponding to the overlapped channels, and channel numbers 277 of different channels overlapped with the corresponding channels. Thus, user convenience is more improved since s/he may be informed of more details of the scanned overlapped channels.

Figure 28:
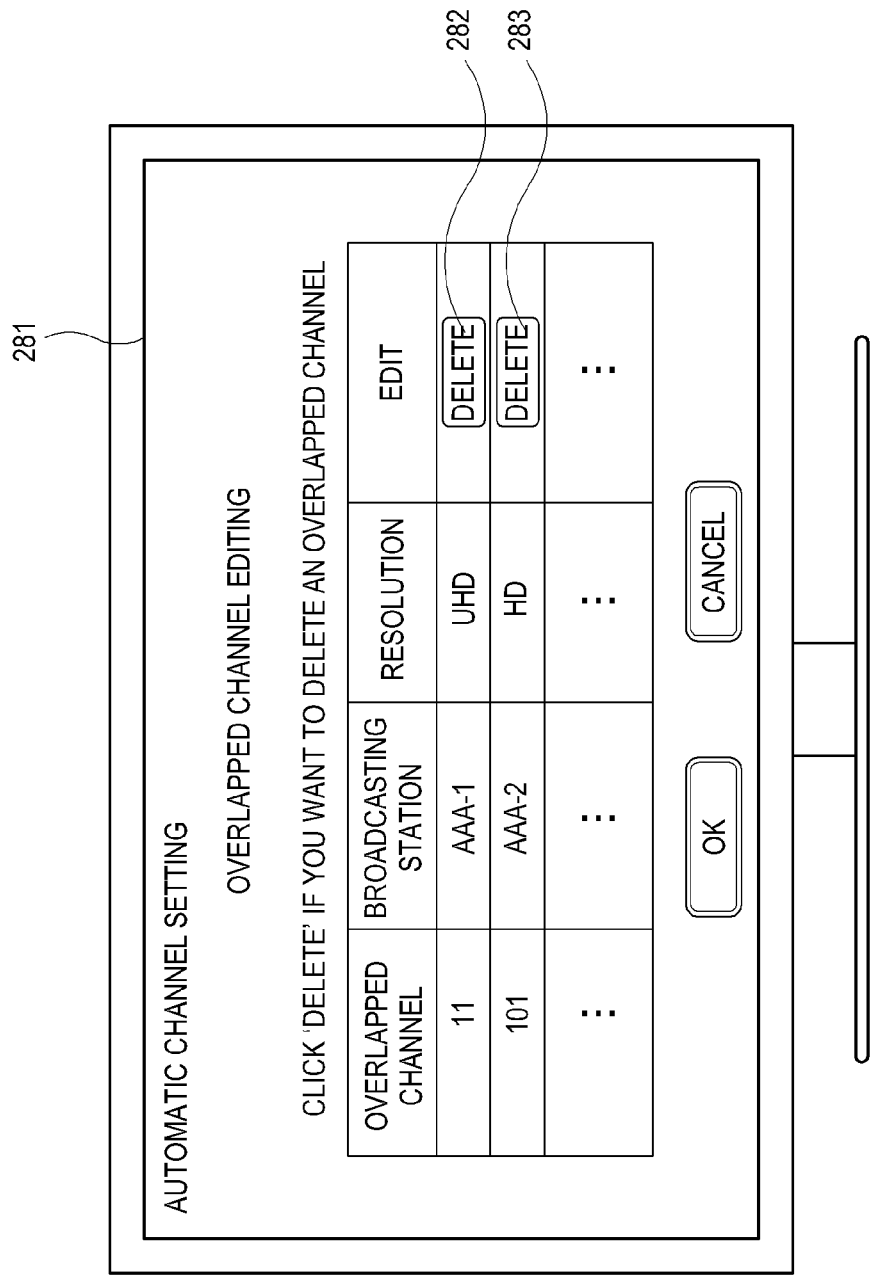
FIG. 28 shows an example of a UI for editing the overlapped channels according to an exemplary embodiment.

Further, the UI 271 of showing the detailed scan result of the overlapped channels may include an item 278 for allowing a user to edit the stored overlapped channels. Referring to FIG. 25, at operation S254 the display apparatus 11 determines whether a user selects the item 278 of the UI 271 in FIG. 27 to edit the stored overlapped channels. If a user selects editing the stored overlapped channels ('Yes' at operation S254), at operation S255 the display apparatus 11 displays a UI for editing the stored overlapped channels. FIG. 28 shows an example of a UI for editing the overlapped channels according to an exemplary embodiment. In this exemplary embodiment, a UI 281 for editing the overlapped channels may include an item 282, 283 provided corresponding to each overlapped channel stored in the channel list and allowing a user to select deleting the corresponding overlapped channel from the channel list. Thus, user convenience is more improved since s/he may easily delete the previously stored overlapped channels through the given UI.

Figure 29:
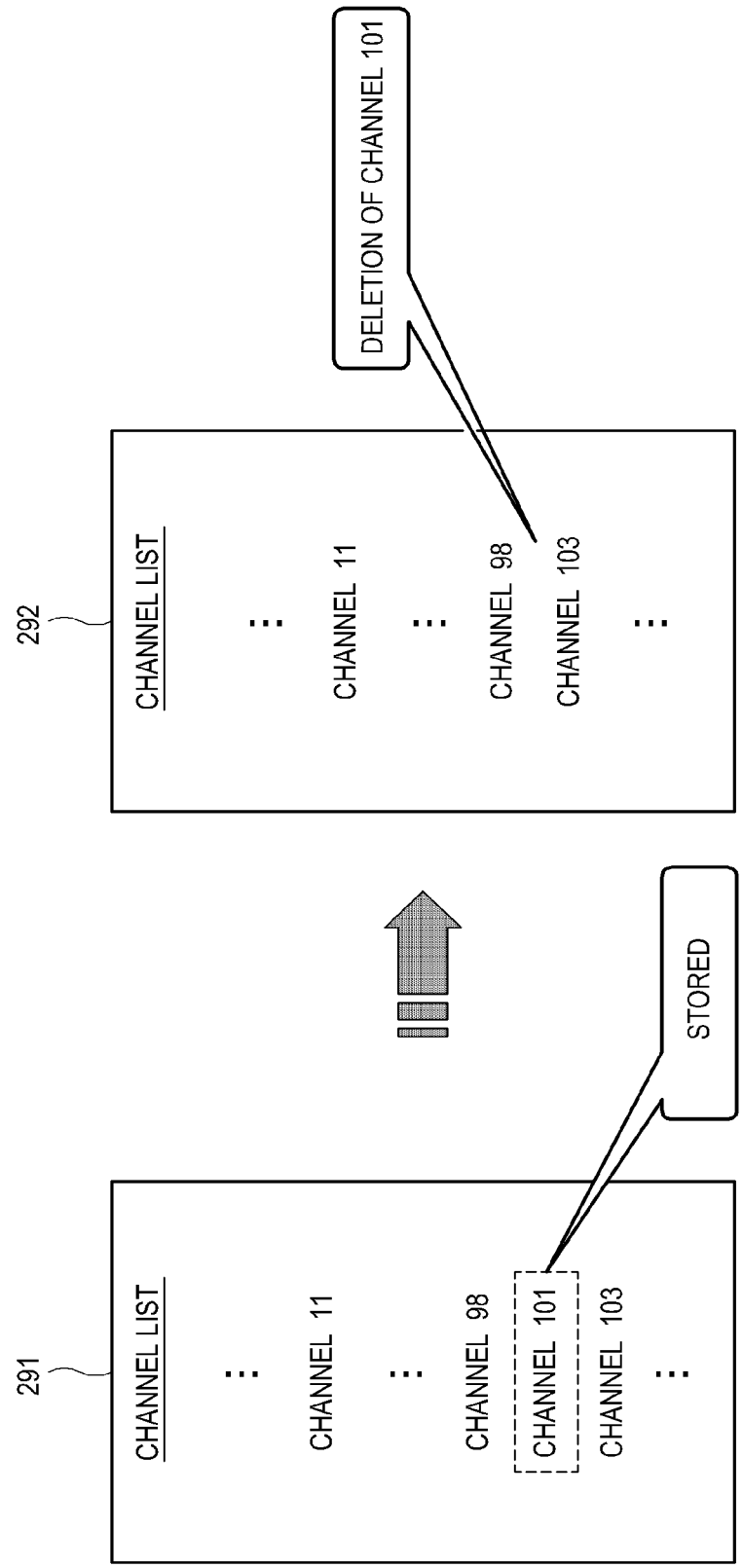
FIG. 29 shows deletion of the previously stored overlapped channel according to an exemplary embodiment.

At operation S256 of FIG. 25, the display apparatus 11 determines whether a user selects the item 282 and/or item 283 on the UI 281 of FIG. 28 to delete the previously stored overlapped channel from the channel list. If it is determined that a user selects deleting the previously stored overlapped channel from the channel list ('Yes' at operation S256), at operation S257 the display apparatus 11 deletes the selected overlapped channels from the channel list. FIG. 29 shows deletion of the previously stored overlapped channel according to an exemplary embodiment. Suppose that the channel of '11' and the channel of '101' stored in the channel list 291 are overlapped with each other after the automatic channel setting. If a user selects deleting the channel of '101', the display apparatus 11 deletes the channel of '101' from the channel list 292. Thus, if a user selects channel-up (+) or channel-down (−) while viewing a broadcast content corresponding to a channel of '98' or '103' in the future, the display apparatus 11 skips the deleted channel of '101' and receives a broadcast signal of the channel of '98' or '103', thereby providing a broadcast content of the corresponding channel.

Figure 30:
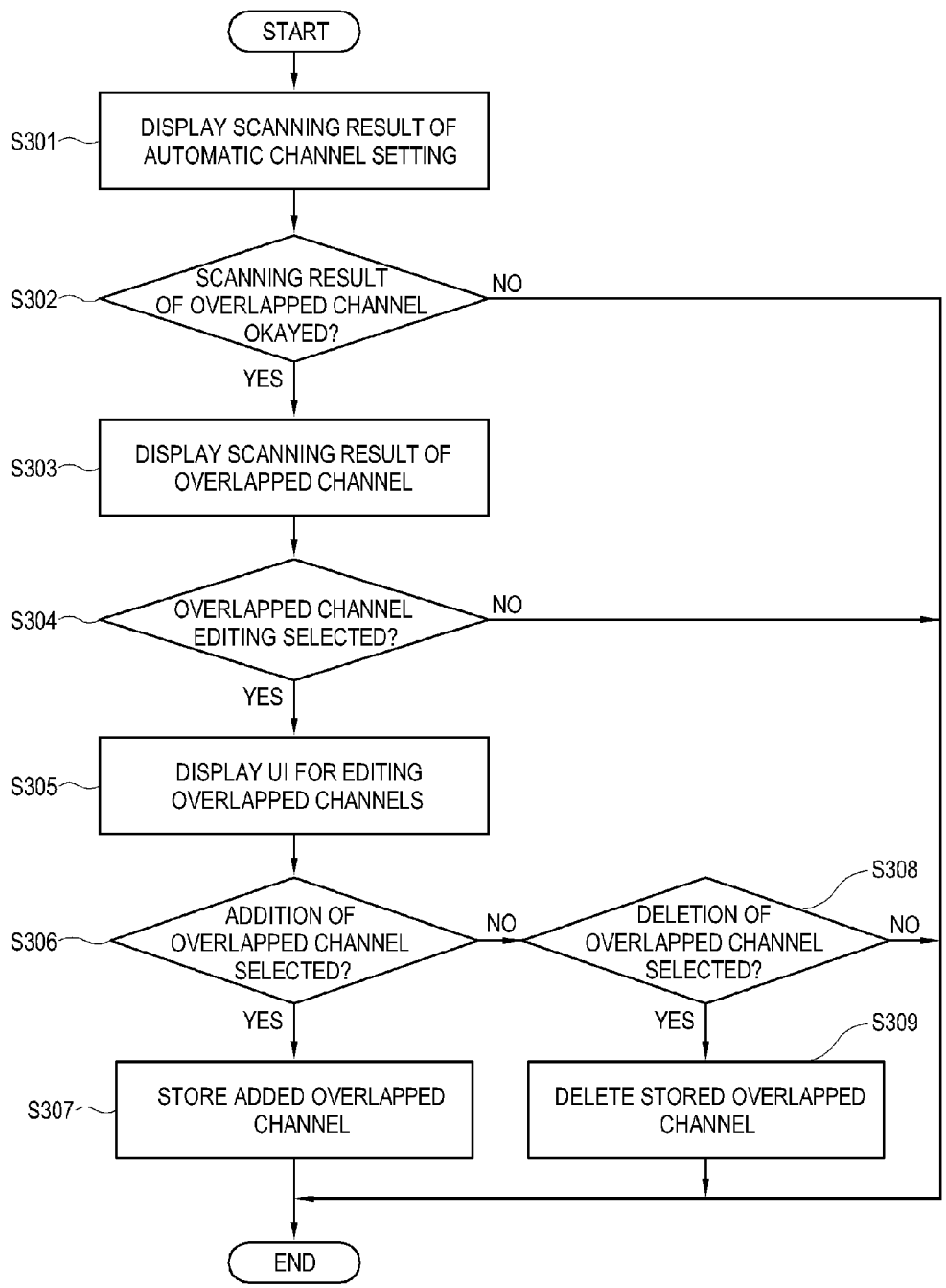
FIG. 30 shows a flowchart of a control method of the display apparatus according to an exemplary embodiment.

FIG. 30 shows a flowchart of a control method of the display apparatus according to an exemplary embodiment. In this exemplary embodiment, the control method of the display apparatus allows or enables a user to check a detailed scan result of the overlapped channels after the automatic channel setting, and edit the stored overlapped channel. Specifically, the overlapped channels are editable if only some channels are stored among the overlapped channels scanned at the automatic channel setting. In describing the control method of the display apparatus according to this exemplary embodiment, the same or similar operations as those of the control method of the display apparatus described with reference to FIG. 25 will be omitted.

First, at operation S301 the display apparatus 11 displays a scan result of the previously scanned automatic channel setting. For example, the display apparatus 11 may display a UI 261 for showing the scan result of the automatic channel setting shown in FIG. 26. Next, at operation S302 of FIG. 30 if a user selects the item 263 on the UI 261 of FIG. 26 to check the detailed scan result of the overlapped channels ('Yes' at operation S302), the display apparatus 11 displays the detailed scan results of the overlapped channels at operation S303.

Figure 31:
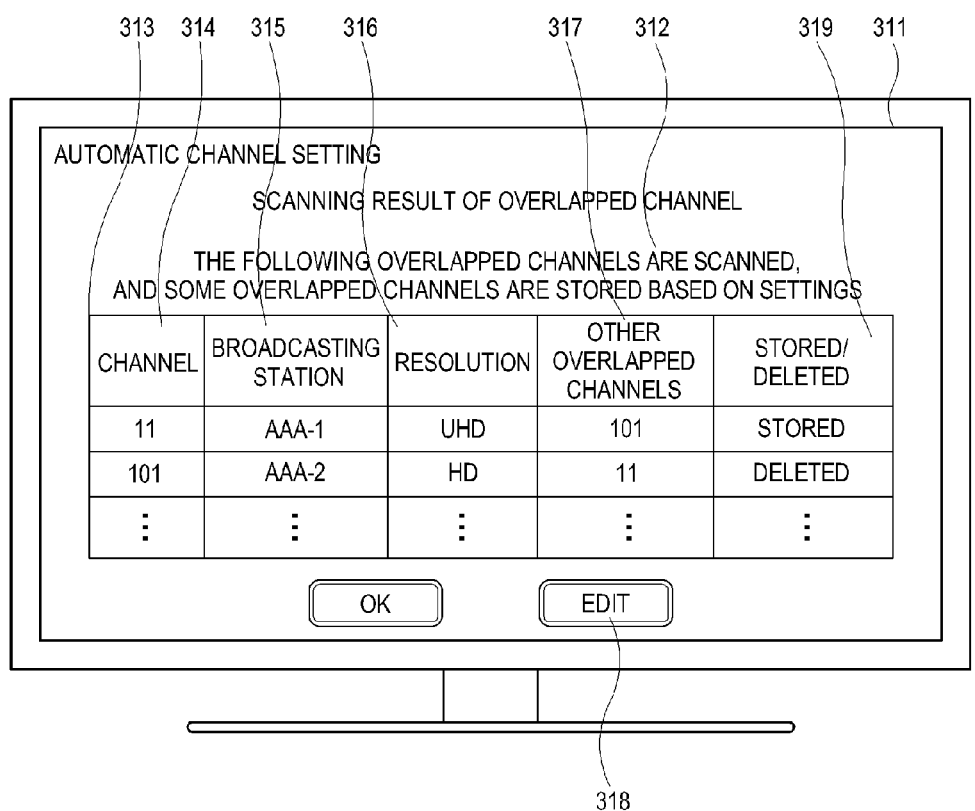
FIG. 31 shows an example of a UI for a detailed scan result of the overlapped channel according to an exemplary embodiment.

FIG. 31 shows an example of a UI for showing a detailed scan result of the overlapped channels according to an exemplary embodiment. In this exemplary embodiment, a UI 311 for showing the detailed scan results of the overlapped channels refers to a UI of when only some channels are stored among the scanned overlapped channels. The UI 311 for showing the detailed scan results of the overlapped channels may include a guide message 312 informing a user that only some among the scanned overlapped channels are stored, and a table 313 showing detailed information about the scanned overlapped channels. The table 313 showing the detailed information of the scanned overlapped channels may include information about channel numbers 314 of scanned overlapped channels, broadcasting stations 315 of transmitting broadcasting signals corresponding to the overlapped channels, resolutions 316 of the broadcast contents corresponding to the overlapped channels, channel numbers 317 of different channels overlapped with the corresponding channels, and information 319 about whether the corresponding overlapped channels are stored or deleted. Further, the UI 311 for showing the detailed scan results of the overlapped channel may further include an item 318 for allowing a user to edit the overlapped channels.

Figure 32:
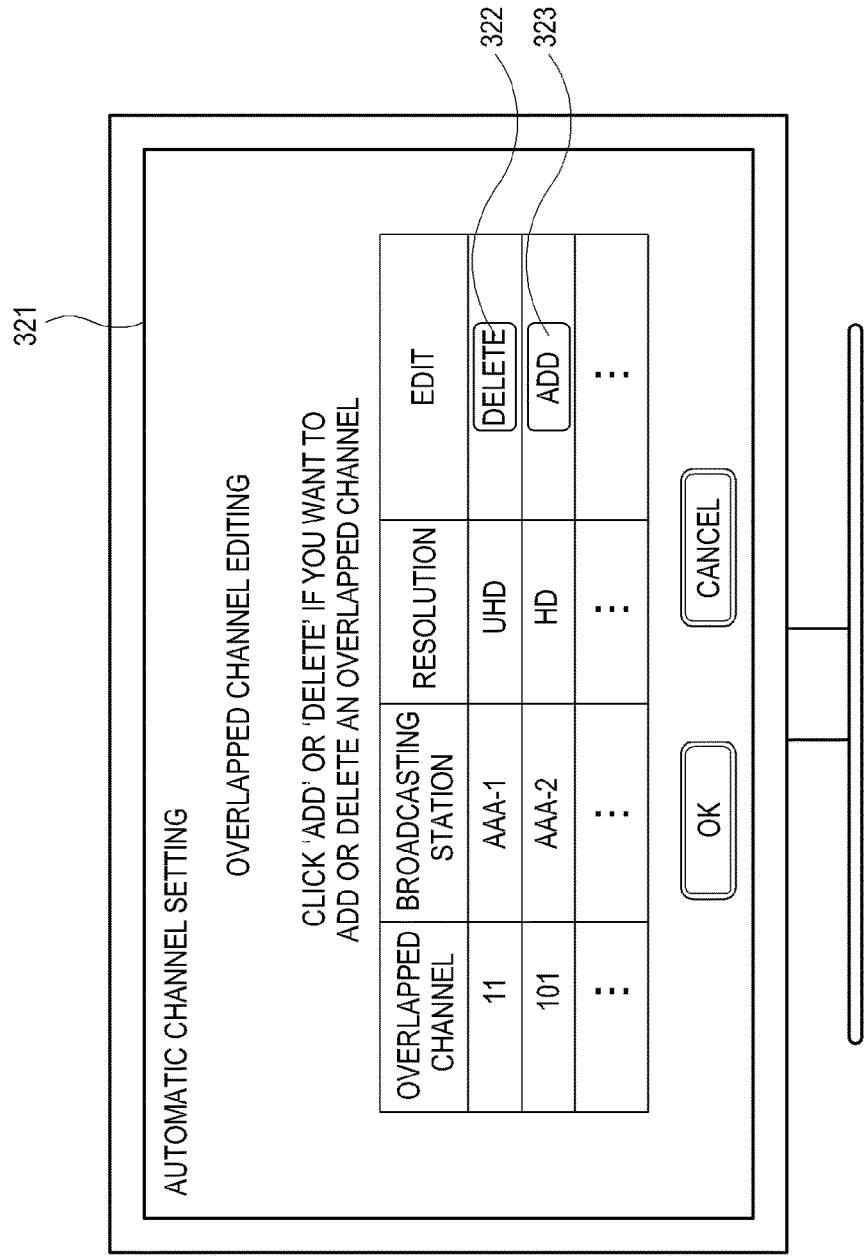
FIG. 32 shows an example of a UI for editing the overlapped channel according to an exemplary embodiment.

Referring back to FIG. 30, at operation S304 the display apparatus 11 determines whether a user selects the item 318 on the UI 311 of FIG. 31 to edit the overlapped channels. If a user selects editing the overlapped channels ('Yes' at operation S304), at operation S305 the display apparatus 11 displays a UI for editing the stored overlapped channels. FIG. 32 shows an example of a UI for editing the overlapped channel according to an exemplary embodiment. In this exemplary embodiment, a UI 321 for editing the overlapped channels may include an item 322 provided corresponding to each scanned overlapped channel and allowing a user to select the stored overlapped channel to be deleted from the channel list, and an item 323 allowing a user to select a not-stored overlapped channel to be added to the channel list. Thus, user convenience is more improved since s/he may easily delete or add the overlapped channels through the given UI.

Figure 33:
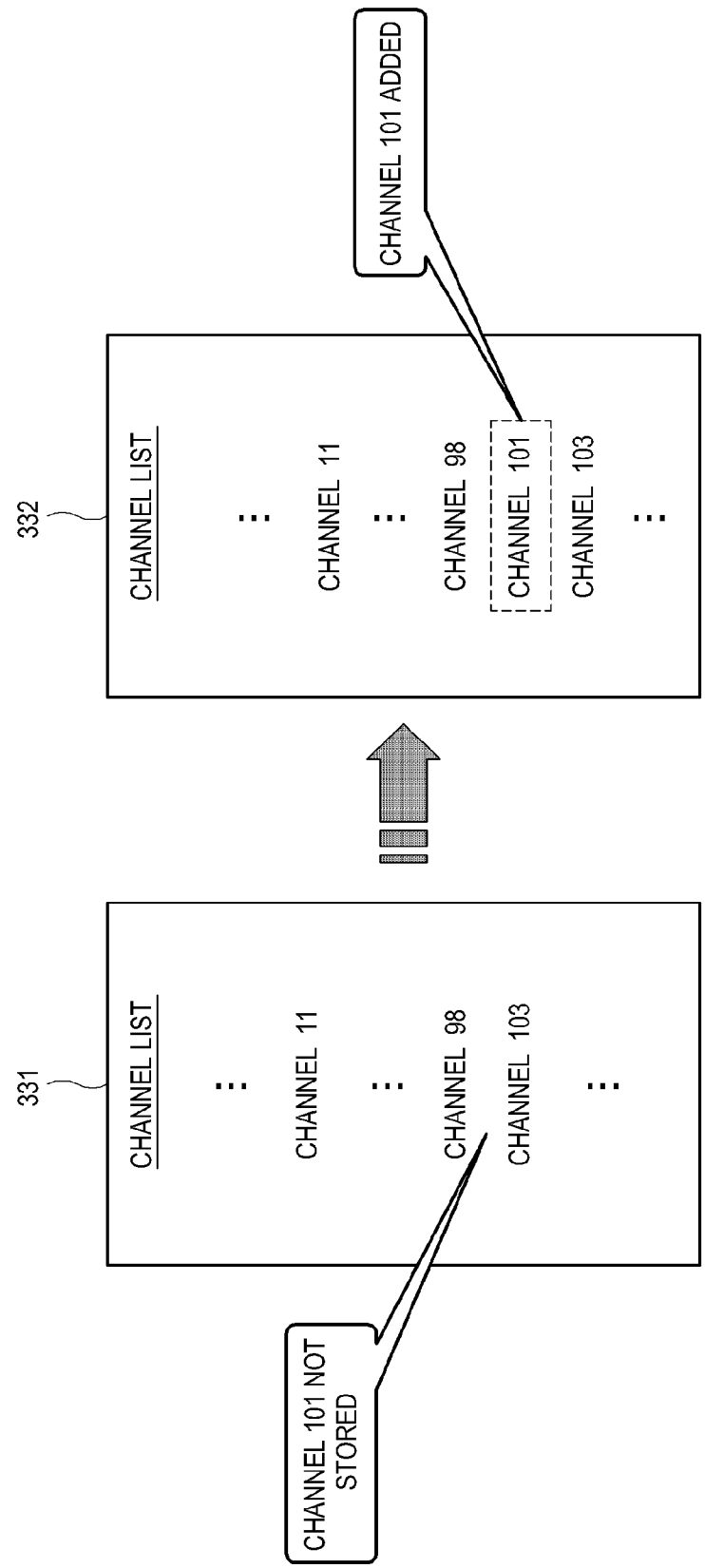
FIG. 33 shows addition of a not-stored overlapped channel according to an exemplary embodiment.

At operation S306 of FIG. 30, the display apparatus 11 determines whether a user selects the item 323 on the UI 321 of FIG. 32 to add the not-stored overlapped channel to the channel list. If a user selects the not-stored overlapped channel to be added to the channel list ('Yes' at operation S306), at operation S307 the display apparatus 11 adds the corresponding overlapped channel to the channel list. FIG. 33 shows addition of a not-stored overlapped channel according to an exemplary embodiment. Suppose that only the channel of '11' among the overlapped channels is stored in the channel list 331, and the channel of '101' is not stored as a result of the automatic channel setting. If a user selects the channel of '101' to be added, the display apparatus 11 adds the channel of '101' to the channel list 332. Thus, if a user selects channel-up (+) or channel-down (−) while viewing a broadcast content corresponding to a channel of '98' or '103' in the future, the display apparatus 11 receives a broadcast signal of the added channel of '98' or '103' and provides a broadcast content of the corresponding channel.

Referring back to FIG. 30, at operation S308 the display apparatus 11 determines whether a user selects the item 322 on the UI 321 of FIG. 32 to delete the previously stored overlapped channel from the channel list. If a user selects the previously stored overlapped channel to be deleted from the channel list ('Yes' at operation S308), at operation S309 the display apparatus 11 deletes the corresponding overlapped channel to the channel list.

Figure 34:
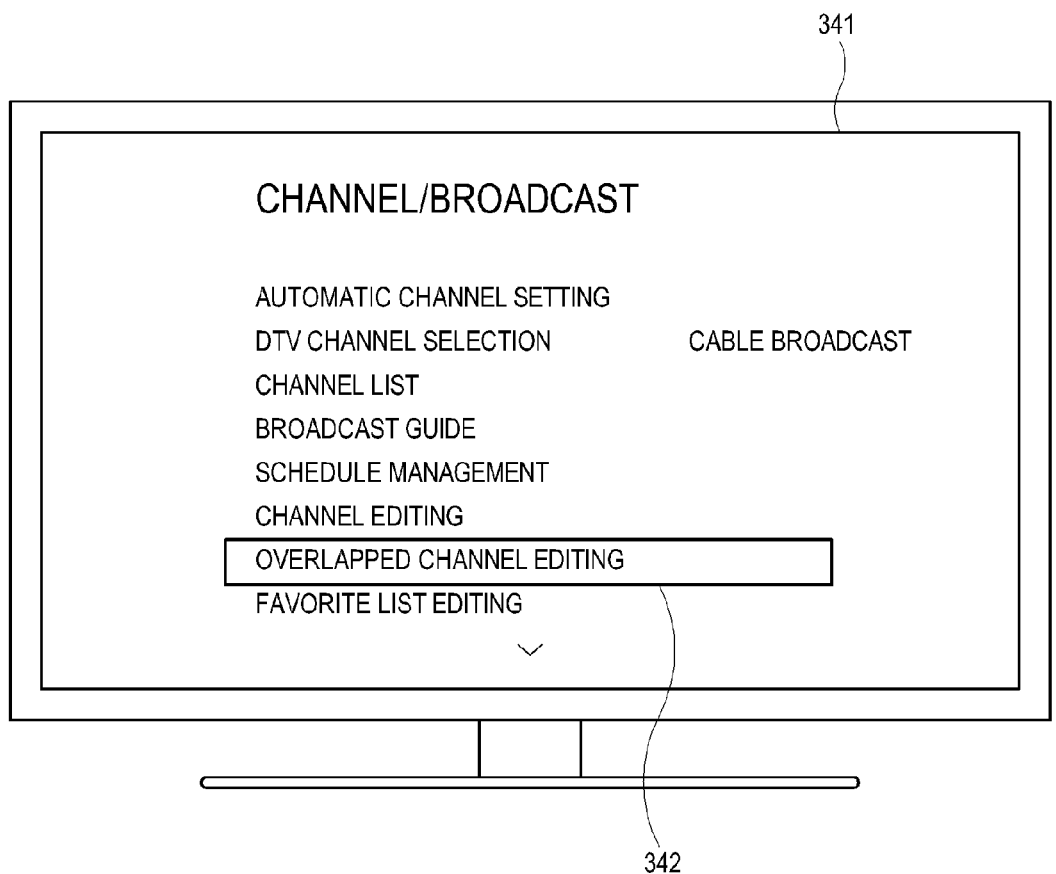
FIG. 34 shows a UI for channel/broadcast setting according to an exemplary embodiment.

In this exemplary embodiment, the overlapped channels may be edited regardless of the automatic channel setting. For example, the display apparatus 11 may edit the overlapped channels in response to a user's request. FIG. 34 shows a UI for channel/broadcast setting according to an exemplary embodiment. If the item 123 for the channel/broadcast setting is selected on the UI 122 of the main menu shown in FIG. 12, the display apparatus 11 may display the UI 341 for the channel/broadcast setting as shown in FIG. 34. The UI 341 for the channel/broadcast setting may further include an item 342 for editing the overlapped channels in addition to the items for the automatic channel setting or the like. If the item 342 for editing the overlapped channels is selected on the UI 341 for the channel/broadcast setting, the display apparatus 11 displays a UI 281 for editing the overlapped channels shown in FIG. 28 or a UI 321 for editing the overlapped channels shown in FIG. 32, and performs editing the overlapped channels in response to a user input using the UI 281 or the UI 321.

Figure 35:
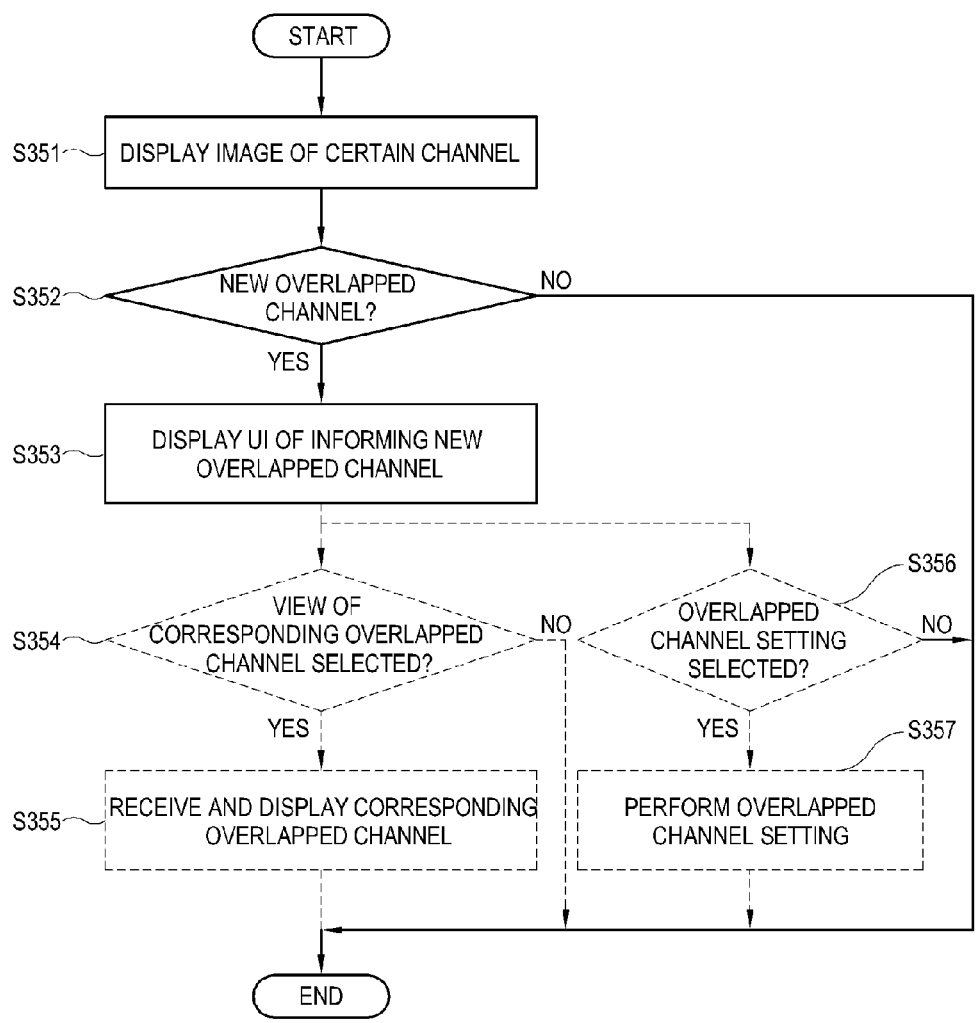
FIG. 35 is a flowchart showing a control method of the display apparatus according to an exemplary embodiment.
Figure 36:
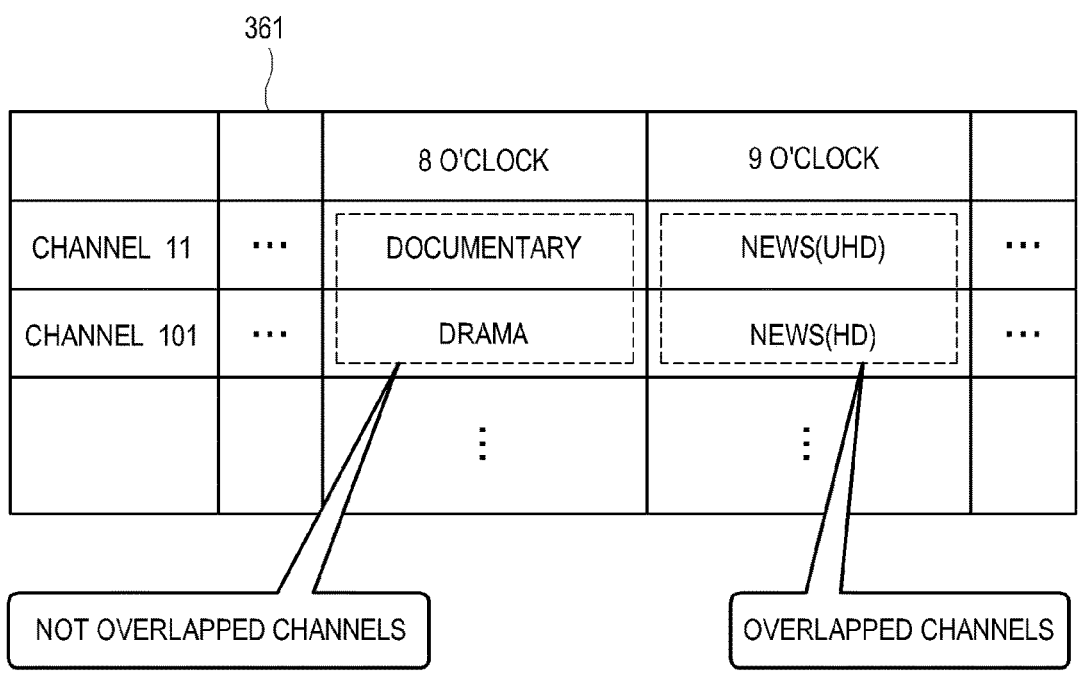
FIG. 36 shows broadcast contents of a plurality of channels corresponding to time slots according to an exemplary embodiment.

FIG. 35 is a flowchart showing a control method of the display apparatus according to an exemplary embodiment. In this exemplary embodiment, the control method of the display apparatus is to perform a corresponding control operation when a new overlapped channel is found. First, at operation S351, the display apparatus 11 receives a broadcast signal of a certain channel and displays an image based on a corresponding broadcast content. FIG. 36 shows broadcast contents 361 of a plurality of channels corresponding to time slots according to an exemplary embodiment. Referring to FIG. 36, for instance, at 8 o'clock, the channel of '11' broadcasts a documentary and the channel of '101' broadcasts a drama. Since these two channels (i.e. the channel of '11' and the channel of '101') are different in the broadcast content from each other, they are not the overlapped channels. However, at 9 o'clock, the channel of '11' broadcasts news in a UHD resolution, and the channel of '101' broadcasts the same news as that which is broadcast on channel of '11' in an HD resolution. Since the two channels (i.e. the channel of '11' and the channel of '101') provide the same broadcast content at 9 o'clock, they are the overlapped channels.

Figure 37:
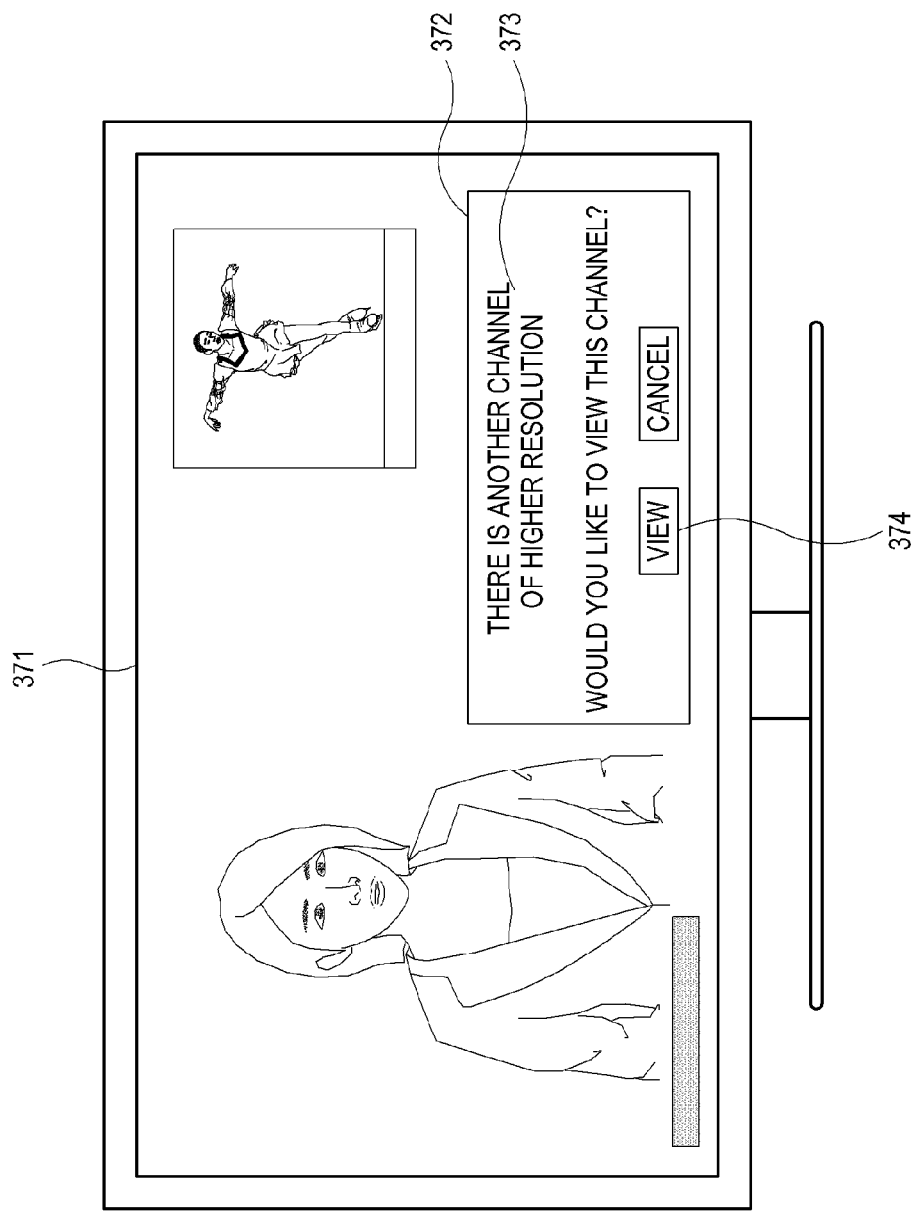
FIG. 37 shows an example of a UI for informing that there is a new overlapped channel according to an exemplary embodiment.

At operation S352 of FIG. 35, the display apparatus 11 determines whether there is a new overlapped channel while displaying an image based on a broadcast content of a certain channel. For example, referring to FIG. 36, the channels (the channel of '11' and the channel of '101') are overlapped at 9 o'clock. If there is a new overlapped channel ('Yes' at operation S352), at operation S353 the display apparatus 11 displays a UI informing that there is a new overlapped channel. FIG. 37 shows an example of a UI for informing that there is a new overlapped channel according to an exemplary embodiment. A UI 372 for informing that there is a new overlapped channel may be provided in a partial area so as not to entirely cover an image 371 of a currently viewing channel. The UI 372 for informing that there is a new overlapped channel may include a guide message 373 for informing that there is a new overlapped channel and informing the resolution of the overlapped channel, and an item 374 for asking whether to move to and view the overlapped channel and selecting the view of the overlapped channel.

At operation S354 of FIG. 35, the display apparatus 11 determines whether a user selects the item 374 of the UI 372 of FIG. 37 to view the overlapped channel. If a user selects the view of the corresponding overlapped channel ('Yes' at operation S354), at operation S355 the display apparatus 11 receives a broadcast signal of the corresponding overlapped channel and displays an image of a corresponding broadcast content. Therefore, user convenience is more improved since s/he may directly move to news of a higher resolution, for example, UHD (the channel of '11') while viewing news of HD (the channel of '101').

Figure 38:
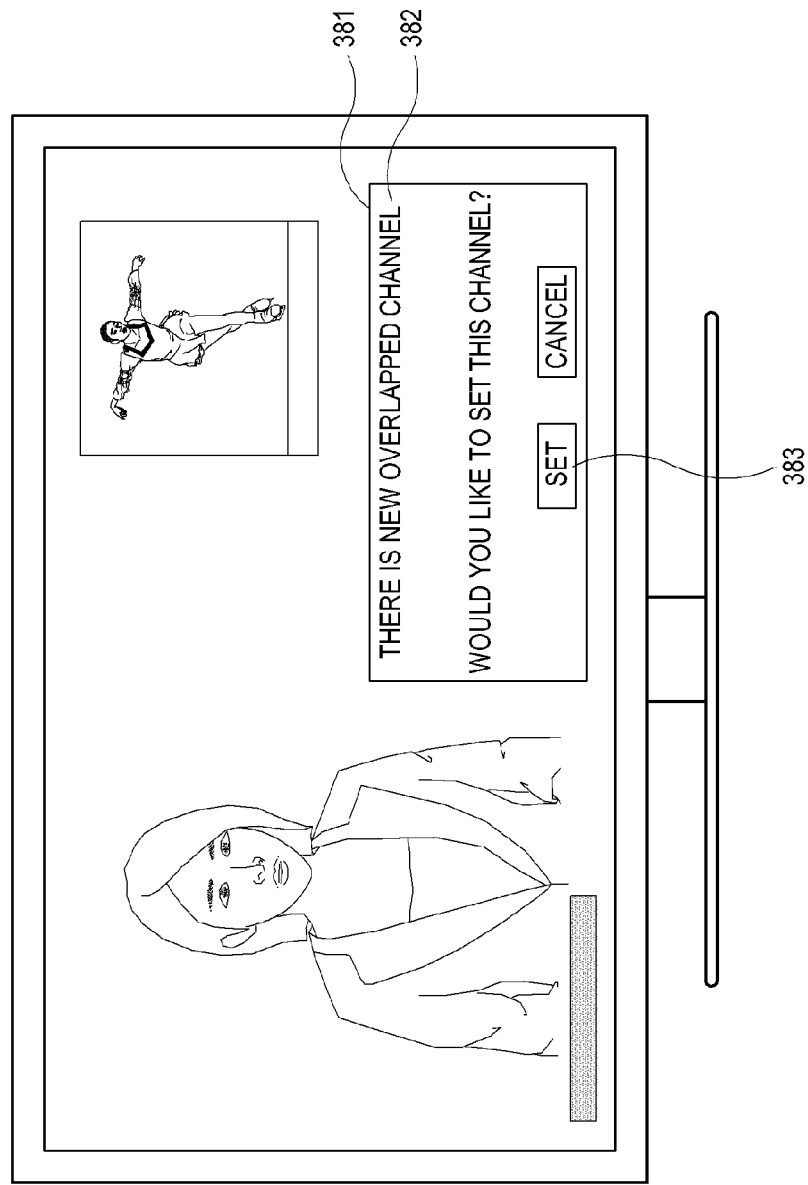
FIG. 38 shows an example of a UI for informing that there is a new overlapped channel according to an exemplary embodiment.

In FIG. 35, operations S354 and S355 may be optional, and alternatively other control operations may be performed instead of the operations S354 and S355. For example, if there is a new overlapped channel, the display apparatus 11 may perform setting the overlapped channels. FIG. 38 shows an example of a UI for informing that there is a new overlapped channel according to an exemplary embodiment. A new UI 381 for informing that there is a new overlapped channel may include a guide message 382 for informing that there is a new overlapped channel, and an item 383 for asking whether to set the overlapped channels and selecting the settings for the overlapped channel.

At operation S356 of FIG. 35, the display apparatus 11 determines whether a user selects an item 383 on the UI 382 of FIG. 38 to perform setting the overlapped channels. If a user selects performing the overlapped channels (Yes' at operation S356), at operation S357 the display apparatus 11 displays a UI 141 or 151 for the overlapped channel setting as shown in FIG. 14 or 15, and performs setting the overlapped channels in accordance with a user's input using the UI 141 or 151. Accordingly, user convenience is more improved since s/he may directly set a new overlapped channel without any separate control for selecting a separate menu.

Figure 39:
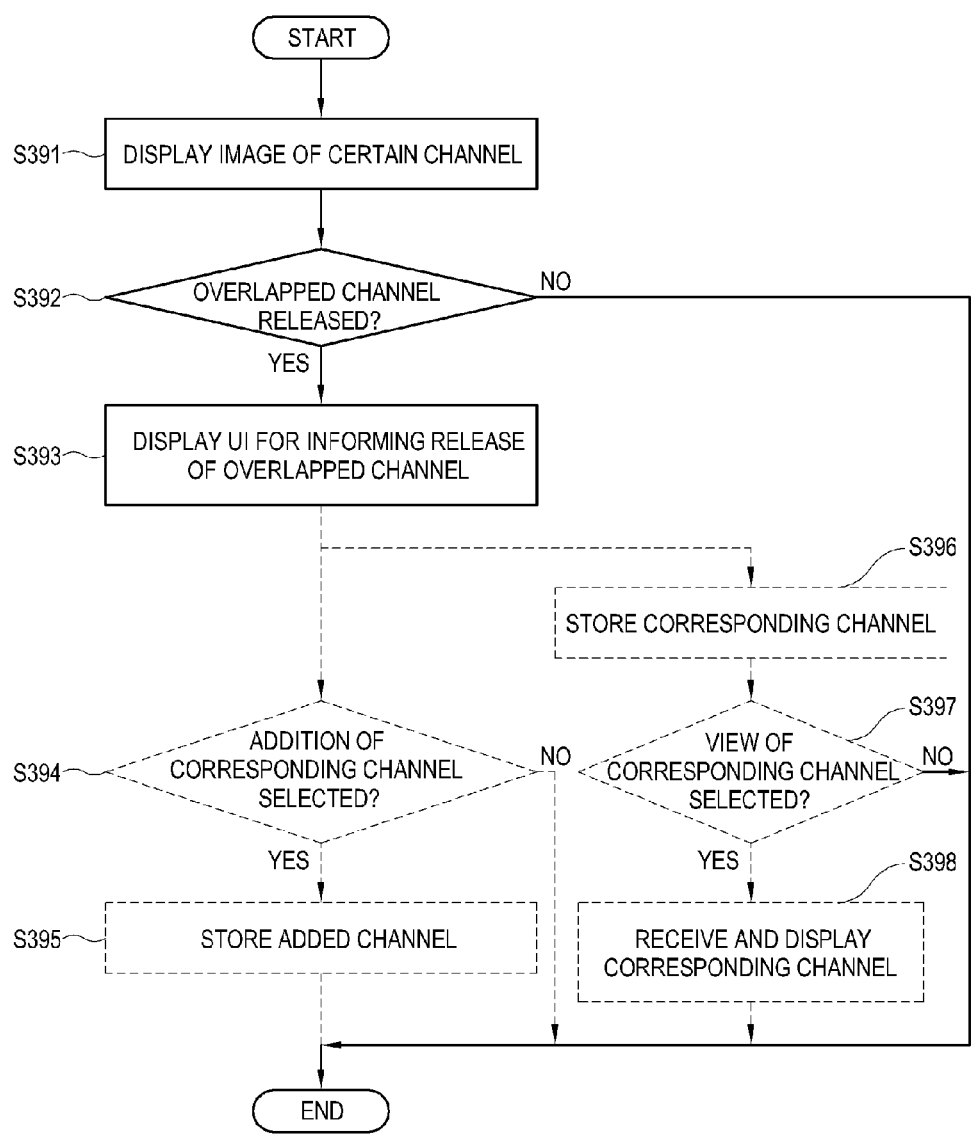
FIG. 39 shows a flowchart showing a control method of the display apparatus according to an exemplary embodiment.

FIG. 39 shows a flowchart showing a control method of the display apparatus according to an exemplary embodiment. In this exemplary embodiment, the control method of the display apparatus may perform control operations when the previously stored overlapped channels are no longer the overlapped channels. In describing the control method of the display apparatus shown in FIG. 39, the same or similar operations as those of the control method of the display apparatus described with reference to FIG. 35 will be omitted.

Figure 40:
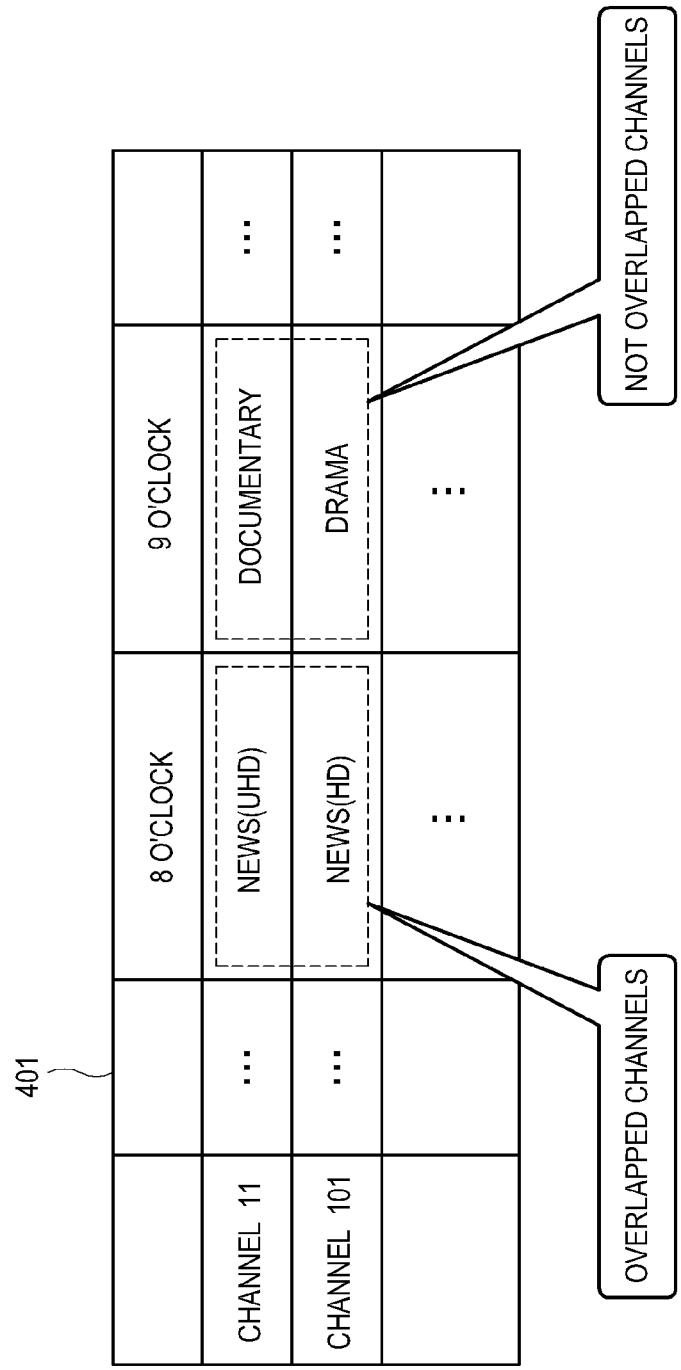
FIG. 40 shows broadcast contents of a plurality of channels corresponding to time slots according to an exemplary embodiment.

First, at operation S391 the display apparatus 11 receives a broadcast signal of a certain channel and displays an image of the corresponding broadcast content. FIG. 40 shows broadcast contents 401 of a plurality of channels corresponding to time slots according to an exemplary embodiment. Referring to FIG. 40, for instance, at 8 o'clock, the channel of '11' broadcasts news in a UHD resolution, and the channel of '101' broadcasts the same news as the channel of '11' in an HD resolution. Since the two channels (i.e. the channel of '11' and the channel of '101') provide the same broadcast content at 8 o'clock, they are the overlapped channels. Suppose that the display apparatus 11 determines these two channels (i.e. the channel of '11' and the channel of '101') as the overlapped channels, and adds only one of the two channels (i.e. the channel of '11' and the channel of '101') to the channel list. However, at 9 o'clock, the channel of '11' broadcasts a documentary and the channel of '101' broadcasts a drama. At this time, the two channels (i.e. the channel of '11' and the channel of '101') are different in the broadcast content from each other, and they are no longer the overlapped channels. Below, change of channels from the overlapped channels into not the overlapped channels will be called or referred to as the 'release of the overlapped channel'.

At operation S392 of FIG. 39, the display apparatus 11 determines whether there is release of the overlapped channels while displaying an image based on a broadcast content of a certain channel. For example, referring to FIG. 39, at 9 o'clock, the channel of '11' and the channel of '101' are no longer the overlapped channels, there is the release of the overlapped channels. For example, the display apparatus 11 may determine that there is the release of the overlapped channels if the same second channel loop information 103 as the channel loop information 105 of the channel of '101' is not included in the VCT 1011 of the channel of '11' shown in FIG. 10. Alternatively, the display apparatus 11 determines whether the broadcast content based on the channel loop information of the channel of '11' is equal to the broadcast content based on the channel loop information of the channel of '101'. For example, as shown in FIG. 40, if the broadcast contents are different from each other as if the channel of '11' broadcasts a documentary and the channel of '101' broadcasts a drama, it is determined that the overlapped channels are released.

Figure 41:
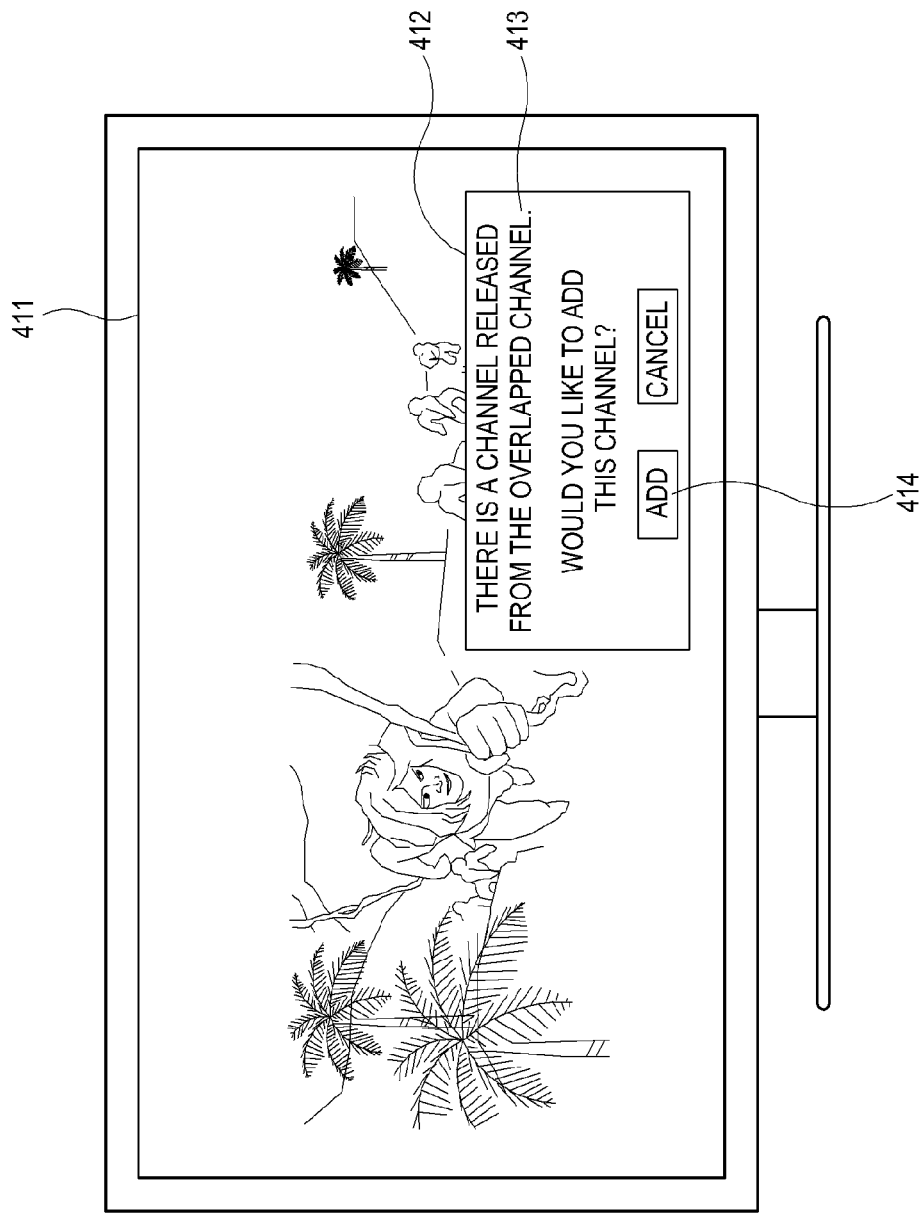
FIG. 41 shows an example of a UI for informing release of the overlapped channel according to an exemplary embodiment.

If the overlapped channels are released ('Yes' at operation S392), at operation S393 the display apparatus 11 displays a UI of informing the release of the overlapped channels. FIG. 41 shows an example of the UI for informing the release of the overlapped channel according to an exemplary embodiment. A UI 412 for informing the release of the overlapped channels may be provided in a partial area so as not to entirely cover an image 411 of a currently viewed channel. The UI 412 for informing the release of the overlapped channels may include a guide message 413 for informing that there is release of the dual channels, and an item 414 for asking whether to add a not-stored channel among the channels released from the overlapped channels to the channel list, and selecting the addition of the corresponding channel.

At operation S394 of FIG. 39, the display apparatus 11 determines whether a user selects the item 414 of the UI 412 of FIG. 41 to add the not-stored channel among the channels released from the overlapped channels to the channel list. If a user selects the addition of the not-stored channel among the channels released from the overlapped channels to the channel list ('Yes' at operation S394), at operation S395 the display apparatus 11 adds the not-stored channel among the channels released from the overlapped channels to the channel list. In this case, the display apparatus 11 displays information about the channels not stored in the channel list among the channels released from the overlapped channels, so that a user may be informed what channel is added to the channel list. Therefore, user convenience is more improved since s/he may easily add a channel released from the overlapped channel and not stored in the channel list to the channel list without any separate control for selecting a menu.

Figure 42:
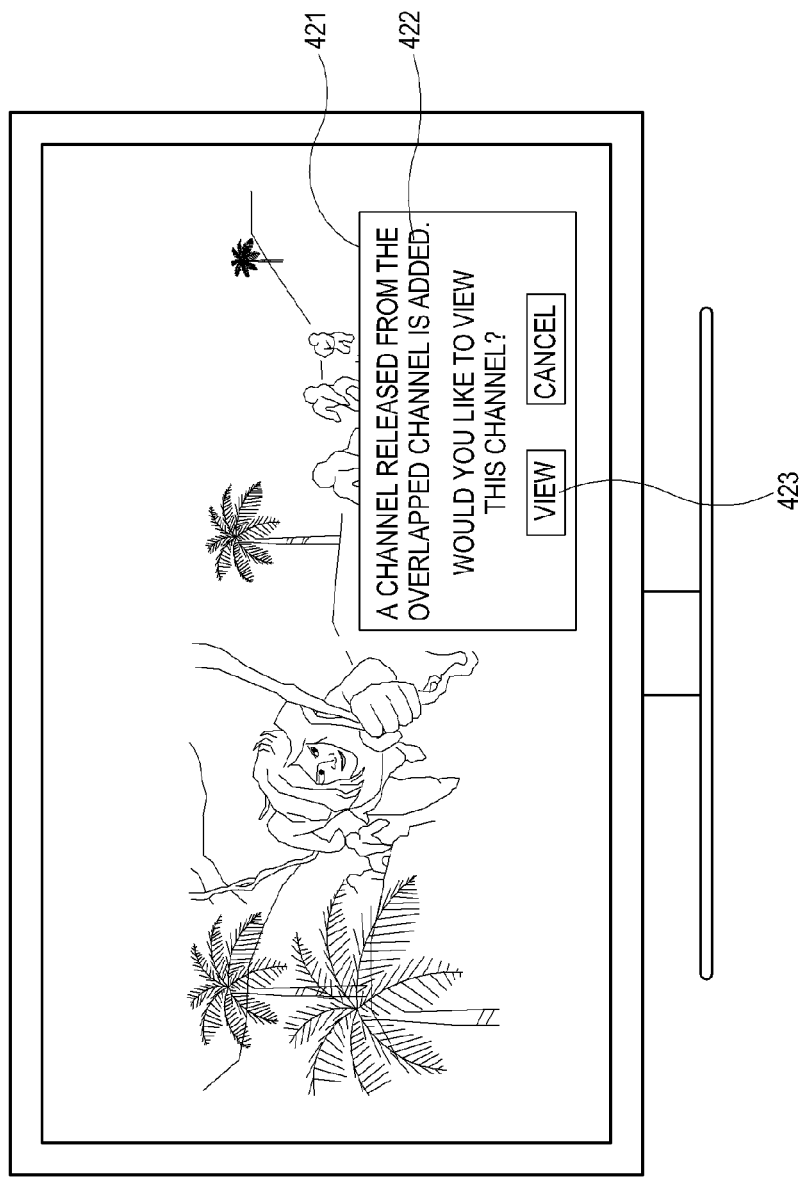
FIG. 42 shows an example of a UI for informing release of the overlapped channel according to an exemplary embodiment.

The operations S394 and S395 in FIG. 39 may be optional, and may be replaced by other control operations. For example, if there is the release of the overlapped channels, at operation S396 of FIG. 39 the display apparatus 11 may automatically add a channel, which is released from the overlapped channel and not stored in the channel list, to the channel list without a user's selection. Further, at operation S397 the display apparatus 11 may ask a user whether to directly move to and view the channel released from the overlapped channels and added to the channel list. FIG. 42 shows an example of a UI for informing the release of the overlapped channel according to an exemplary embodiment. A UI 421 for informing the release of the overlapped channel may include a guide message 422 for informing that the channel released from the overlapped channels and not included in the channel list is stored in the channel, and an item 423 for asking whether to move to and view the corresponding channel and selecting the view of the channel. At operation S397 the display apparatus 11 determines whether a user selects the item 423 on the UI 421 of FIG. 42 to view the corresponding channel. If a user selects the view of the corresponding channel ('Yes' at operation S397), at operation S398 the display apparatus 11 receives a broadcast signal of the corresponding channel and displays an image based on a corresponding broadcast content. For example, a user may directly move to and view a drama (the channel of '101') from view of a documentary (the channel of '11'). Thus, user convenience is more improved.

As described above, it is possible to provide information about the overlapped channel or operate based on the information about the overlapped channel, thereby improving user convenience.

Further, according to one or more exemplary embodiments, it is more reliable and easier to determine whether channels are the overlapped channels.

Further, according to one or more exemplary embodiments, channel information for informing whether a channel is an overlapped channel or not is added to a broadcast signal of the corresponding channel when the overlapped channels are broadcasted, it is possible to prevent confusion between a broadcaster and the display apparatus about processing the overlapped channels and to easily process the overlapped channels.

Although embodiments have been shown and described, it will be appreciated by those skilled in the art that changes may be made to these embodiments without departing from the principles and spirit of the disclosure. Therefore, the foregoing has to be considered as illustrative only. The scope of the disclosure is defined in the appended claims and their equivalents. Accordingly, all suitable modification and equivalents may fall within the scope of the disclosure.

What is claimed is:

1. A display apparatus, comprising:
a signal receiver configured to receive a broadcast signal comprising a broadcast program and channel information, corresponding to a channel of a plurality of channels;
a signal processor configured to process the broadcast signal received by the signal receiver and to extract the broadcast program and the channel information from the broadcast signal;
a display; and
a controller configured:
in response to channel information of a first channel among the plurality of channels and channel information of a second channel among the plurality of channels being included in a channel information field extracted from a broadcast signal corresponding to the first channel, to determine the first channel and the second channel as overlapped channels,
to perform a control operation for the overlapped channels, and
to store a channel list that selectively comprises all or some channels among the overlapped channels,
wherein
the channel information of the second channel included in the channel information field of the first channel is the same as channel information included in a channel information field of the second channel,
if a channel determined as the overlapped channel is later determined to no longer be an overlapped channel, the controller is configured to display a user interface (UI) for informing a user that the corresponding channel is released from the overlapped channel so that the channel released from the overlapped channel is added to the channel list.

2. The display apparatus according to claim 1, wherein channel information of at least one of the overlapped channels comprises the channel information of the first channel for providing the broadcast program and includes a first type of broadcast content, and the channel information of the second channel for providing the broadcast program and includes a second type of broadcast content, and
the second type of broadcast content is different from the first type of broadcast content.

3. The display apparatus according to claim 2, wherein the channel information of at least one of the overlapped channels comprises information about at least one of a broadcast content identification (ID), a broadcasting station ID, a channel ID, a carrier frequency, and a modulation mode, and
the channel information of the first channel and the channel information of the second channel are different in information regarding at least one of the broadcast content ID, the broadcasting station ID, the channel ID, the carrier frequency, and the modulation mode.

4. The display apparatus according to claim 2, wherein first channel information of the first channel and the channel information of the second channel are contained in a same channel loop of a virtual channel table (VCT) of a corresponding channel.

5. The display apparatus according to claim 2, wherein the broadcast signal of the first channel comprises the channel information of the first channel and the channel information of the second channel, and the broadcast signal of the second channel comprises the channel information of the second channel.

6. The display apparatus according to claim 1, wherein a type of the broadcast content comprises at least one of a resolution and a video format of the broadcast program.

7. The display apparatus according to claim 1, wherein the controller is configured to display the UI for selecting whether to add one or more overlapped channels to the channel list, and
the channel list is stored in accordance with a user input using the UI.

8. The display apparatus according to claim 7, wherein the controller is configured to display the UI during automatic channel setting.

9. The display apparatus according to claim 7, wherein the UI comprises an item to delete one or more overlapped channels from the channel list or to add one or more overlapped channels not included in the channel list.

10. The display apparatus according to claim 1, wherein the controller is configured to display the UI for informing a user that there is an overlapped channel if a channel corresponding to the overlapped channel is scanned while receiving the broadcast signal.

11. The display apparatus according to claim 10, wherein the controller is configured to display the UI for selecting whether to add the scanned overlapped channel to the channel list.

12. The display apparatus according to claim 1, wherein if the channel released from the overlapped channel is not included in the channel list, the controller is configured to add the corresponding channel to the channel list.

13. The display apparatus according to claim 1, wherein:
the controller compares the channel information of the first channel with other channels to determine whether the channel information of the second channel among the plurality of channels is included in the channel information of the first channel.

14. A method of controlling a display apparatus, the method comprising:
receiving a broadcast signal which comprises a broadcast program and channel information, corresponding to a channel among a plurality of channels;
extracting the broadcast program and the channel information from the broadcast signal by processing the received broadcast signal;
displaying an image based on the extracted broadcast program;
in response to channel information of a first channel among the plurality of channels and channel information of a second channel among the plurality of channels being included in a channel information field extracted from a broadcast signal corresponding to the first channel, determining the first channel and the second channel as overlapped channels; and
performing a control operation for the overlapped channels including storing a channel list that selectively comprises all or some channels among the overlapped channels,
wherein
the channel information of the second channel included in the channel information field of the first channel is the same as channel information included in a channel information field of the second channel,
if a channel determined as the overlapped channel is later determined to no longer be an overlapped channel, performing the control operation comprises displaying a user interface (UI) for informing a user that the corresponding channel is released from the overlapped channel so that the channel released from the overlapped channel is added to the channel list.

15. The method according to claim 14, wherein channel information of one of the overlapped channels comprises the channel information of the first channel for providing the broadcast program and includes a first type of broadcast content, and the channel information of the second channel includes a second type of broadcast content, and
the second type of broadcast content is different from the first type of broadcast content.

16. The method according to claim 15, wherein the channel information of at least one of the overlapped channels comprises information about at least one of a broadcast content identification (ID), a broadcasting station ID, a channel ID, a carrier frequency, and a modulation mode, and
the channel information of the first channel and the channel information of the second channel are different in information regarding at least one of the broadcast content ID, the broadcasting station ID, the channel ID, the carrier frequency, and the modulation mode.

17. The method according to claim 15, wherein the channel information of the first channel and the channel information of the second channel are contained in a same channel loop of a virtual channel table (VCT) of a corresponding channel.

18. The method according to claim 15, wherein the broadcast signal of the first channel comprises the channel information of the first channel and the channel information of the second channel, and the broadcast signal of the second channel comprises the channel information of the second channel.

19. The method according to claim 14, wherein a type of the broadcast content of the first channel and the second channel comprises at least one of a resolution and a video format of the broadcast program.

20. The method according to claim 14, wherein performing the control operation comprises displaying the UI for selecting whether to add one or more overlapped channels to the channel list, and
storing the channel list comprises storing the channel list in accordance with a user input using the UI.

21. The method according to claim 20, wherein displaying the UI comprises displaying the UI during automatic channel setting.

22. The method according to claim 20, wherein the UI comprises an item to delete one or more overlapped channels from the channel list or to add one or more overlapped channels not included in the channel list.

23. The method according to claim 14, wherein performing the control operation comprises displaying the UI for informing a user that there is an overlapped channel if a channel corresponding to the overlapped channel is scanned while receiving the broadcast signal.

24. The method according to claim 23, wherein performing the control operation comprises displaying the UI for selecting whether to add the scanned overlapped channel to the channel list.

25. The method according to claim 14, wherein if the channel released from the overlapped channel is not included in the channel list, performing the control operation comprises adding the corresponding channel to the channel list.

* * * * *